United States Patent
Reynolds

(10) Patent No.: US 8,191,911 B1
(45) Date of Patent: Jun. 5, 2012

(54) MULTIPLE TORSION BAR CARTRIDGE SUSPENSION SYSTEMS APPLICATIONS

(76) Inventor: Norm Reynolds, Muskego, WI (US)

( * ) Notice: Subject to any disclaimer, the term of this patent is extended or adjusted under 35 U.S.C. 154(b) by 160 days.

(21) Appl. No.: 12/378,578

(22) Filed: Feb. 18, 2009

(51) Int. Cl.
*B60G 11/18* (2006.01)

(52) U.S. Cl. ............. 280/124.166; 267/273; 280/124.13

(58) Field of Classification Search .................. 267/273, 267/285; 280/5.514, 6.157, 6.159, 124.107, 280/124.128, 124.129, 124.13, 124.166, 280/124.169, 86.5
See application file for complete search history.

(56) References Cited

U.S. PATENT DOCUMENTS

| | | | | | |
|---|---|---|---|---|---|
| 2,194,964 | A | * | 3/1940 | Willson | 267/283 |
| 2,227,762 | A | * | 1/1941 | Ronning | 267/275 |
| 2,286,609 | A | * | 6/1942 | Ledwinka | 267/280 |
| 3,207,497 | A | * | 9/1965 | Schoonover | 267/283 |
| 3,337,236 | A | * | 8/1967 | Peterson | 280/124.101 |
| 3,844,583 | A | * | 10/1974 | Sakow et al. | 280/124.102 |
| 4,723,790 | A | * | 2/1988 | Wharton | 280/124.13 |
| 4,917,402 | A | * | 4/1990 | Reynolds et al. | 280/789 |
| 4,921,231 | A | * | 5/1990 | Reynolds et al. | 267/196 |
| 5,158,321 | A | * | 10/1992 | Maul | 280/124.166 |
| 5,161,818 | A | * | 11/1992 | Kopieczek | 280/124.107 |
| 5,163,701 | A | * | 11/1992 | Cromley, Jr. | 280/124.13 |
| 5,263,736 | A | * | 11/1993 | Stevens | 280/6.157 |
| 5,277,450 | A | * | 1/1994 | Henschen | 280/6.151 |
| 5,326,128 | A | * | 7/1994 | Cromley, Jr. | 280/656 |
| 5,411,287 | A | * | 5/1995 | Henschen | 280/124.169 |
| 6,447,073 | B1 | * | 9/2002 | Goettker | 301/127 |
| 6,454,284 | B1 | * | 9/2002 | Worman, Jr. | 280/124.167 |
| 6,948,707 | B2 | * | 9/2005 | Gradu | 267/191 |
| 7,413,196 | B2 | * | 8/2008 | Borowski | 280/5.511 |
| 2004/0217568 | A1 | * | 11/2004 | Gradu | 280/124.107 |
| 2006/0022424 | A1 | * | 2/2006 | Reynolds | 280/124.169 |

* cited by examiner

*Primary Examiner* — Paul N Dickson
*Assistant Examiner* — Laura Freedman
(74) *Attorney, Agent, or Firm* — Donald J. Ersler

(57) ABSTRACT

An active torsion cartridge may be installed in numerous vehicle applications. An active torque tube subassembly begins with a drawbar bearing securely pressed into a torque insert bore. A torque insert is intimately installed into mating active torque tube. The active torque tube exhibits a finished circular section at the inside end and an outer machined configuration matching the torque insert on the outer end to maintain material wall thickness and load carrying capacity. When the two surfaces meet, multi-point shoulders are created for future use. A retaining ring is installed into mating groove in torque tube inside end. An active torque tube bearing is securely pressed into a bearing housing bore and protruding as desired for thrust loading. An opposite end of a protruding thrust bearing is carefully aligned with active torque tube machined configuration and torque tube bearing slides fully onto its diameter and abuts retaining ring.

15 Claims, 20 Drawing Sheets

AXLE TUBE IN FRAME

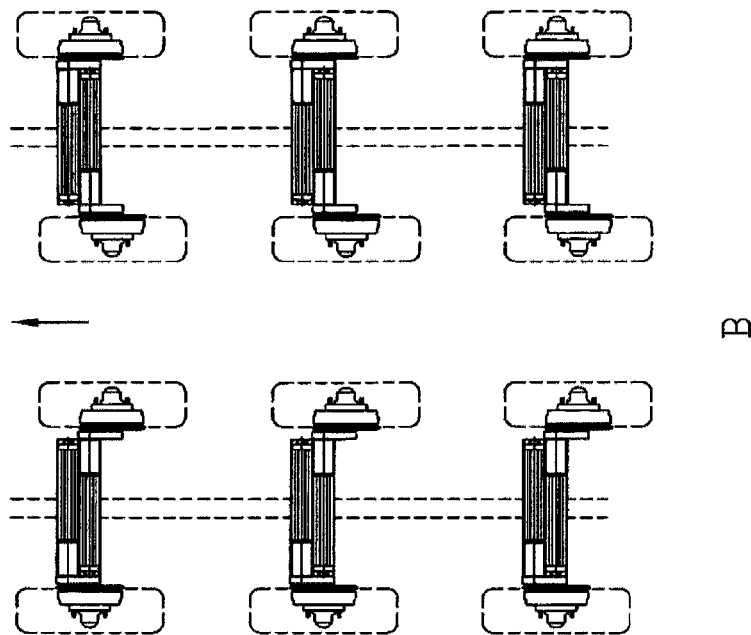
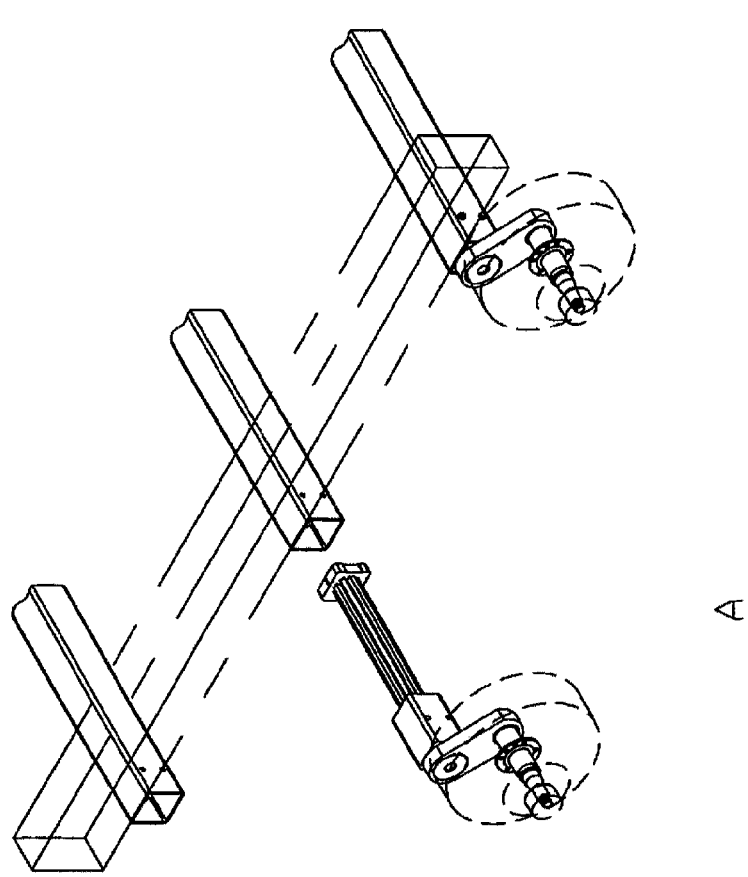
FIG. 16

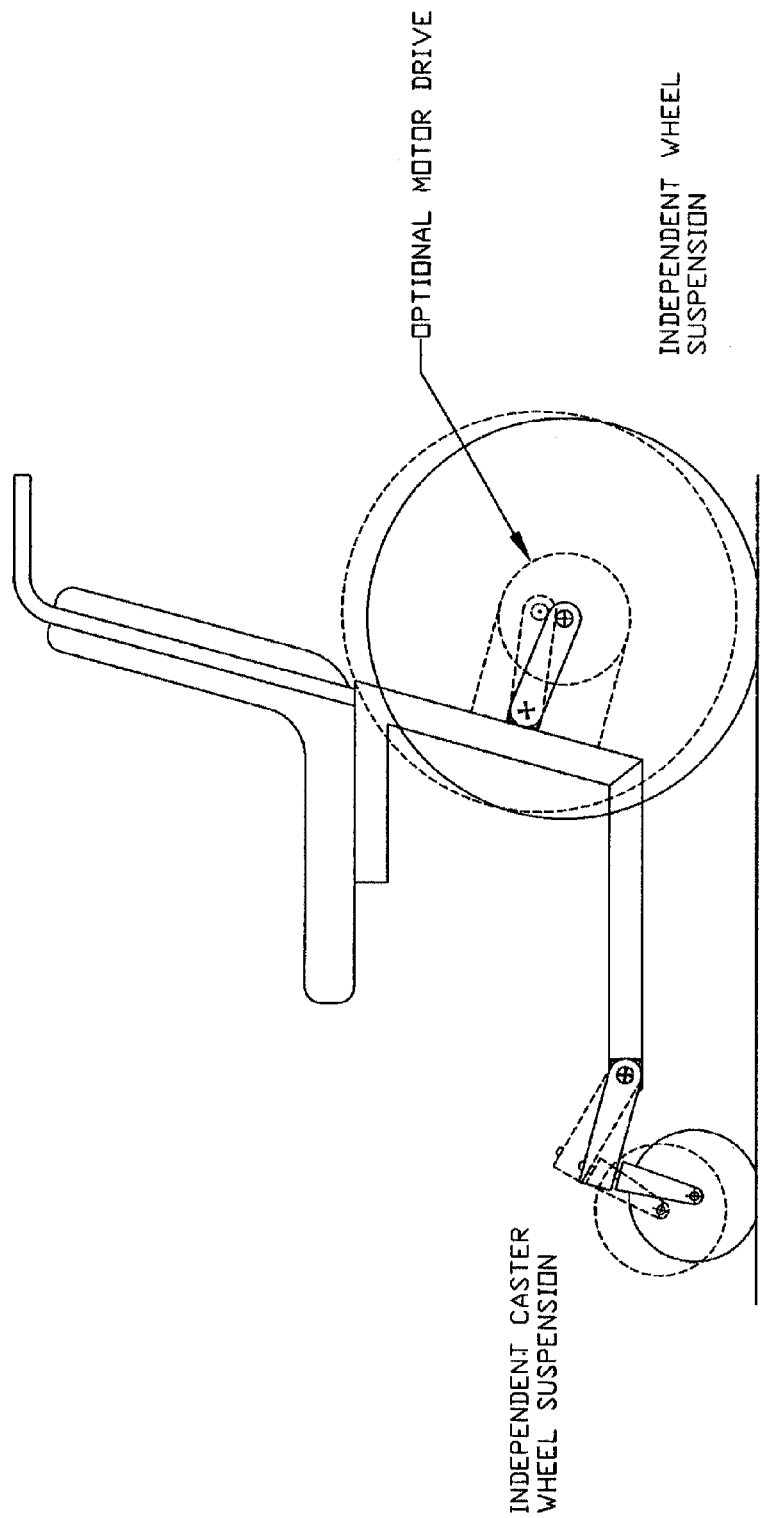

MULTIPLE TORSION BAR CARTRIDGE SUSPENSION SYSTEMS APPLICATIONS

INVENTION BACKGROUND

The present inventions relate to multiple torsion bar cartridge suspension systems, specific modifications, and related technology for vehicular applications, new and those that can be retrofitted.

Vehicles that transport passengers, cargo, and specific items require a complete suspension system for desired ride quality over road surface variations and improved and safe road manners. Current suspension systems for each wheel involve a spring, a positioning device, such as an A-arm, a matched shock absorber to spring rate, and a matched anti-sway bar interconnecting opposite sides. These combined items require operational room, high-unsprung mass, and excess weight and cost to the vehicle. Because of all these items for each wheel, many products have been unable or inequitable to make mobile for use, flexibility, and versatility.

Current torsion axle designs used on vehicles include a long single bar, multiple torsion bar compact cartridges, and rubber in shear torsion and rubber cords in compression. Except for multiple torsion bar cartridges, all the others require a matching shock absorber to spring rate for desired ride qualities. Multiple torsion bar cartridges with bars about a neutral axis have some self-dampening qualities, but unknown and undetermined to predict desired properties. Mounted axle tube torsion axles are unable to adjust for loading, load equalizing, and become active for integrated independent wheel action. Assembly weight and size prevent equitable use in temporary transportation items, especially manufactured homes and stationary equipment that are delivered to a site and hardly ever used again.

Therefore, there are needs for multiple torsion bar cartridges that provide compact and predetermined properties as complete and operational suspension systems. This includes being made active to adjust for wheel loading and vehicle transport height, using alternate materials for desired additional properties, and modified for steerable or drive applications. Further, the ability to easily recycle on-demand from various axle tube installations, provide simple mobility to stationary equipment, and increase comfort with stability to constrained occupants having little ability.

BRIEF DESCRIPTION OF THE DRAWINGS

FIG. 2a is an end view of a torque tube with a torque insert.

FIG. 2b is an end view of a torque tube with an insert and a plurality of segments.

FIG. 5a is an end view of a torsion bar of a tuned cartridge suspension system.

FIG. 9a is an end view of two split bearing blocks of an integrated torsion subassembly.

FIG. 16a is a partially exploded perspective view of a HUD code frame with multiple axle tubes and a braked torsion bar cartridge.

FIG. 16b is a top view of two parallel frame rails, each frame rail retaining multiple torsion bar cartridges.

FIG. 20 is a side view of a wheelchair suspension system utilizing multiple torsion bar cartridges.

INVENTION SUMMARIES

Leading Torquearm and Bearing Assembly

Typical torsion axles have trailing torquearms to control vehicle wheel agitation as it travels over the terrain and experiences side thrusts. To provide reasonable ride qualities, the trailing torquearm and wheel center are below and behind the axle pivot center to properly receive wheel impact vector. The axle mounting is below the frame rail, resulting in the wheel center well below the frame rail bottom and making the vehicle CG well above the ground, as in FIG. 1A. If the wheel center is above the axle pivot center to lower both frame rail and CG, as in FIG. 1B, there is mechanically more effort in tensile loading the torquearm than inducing torsion action upon wheel impact. This results in poor ride quality and greater frame stressing. Torquearm tensile loading will often cause the vehicle to be thrust sideways as one wheel impacts an obstacle and the other does not.

Prior art is unavailable for a leading torquearm multiple torsion bar cartridge suspension system and none are currently marketed.

Figure 1:
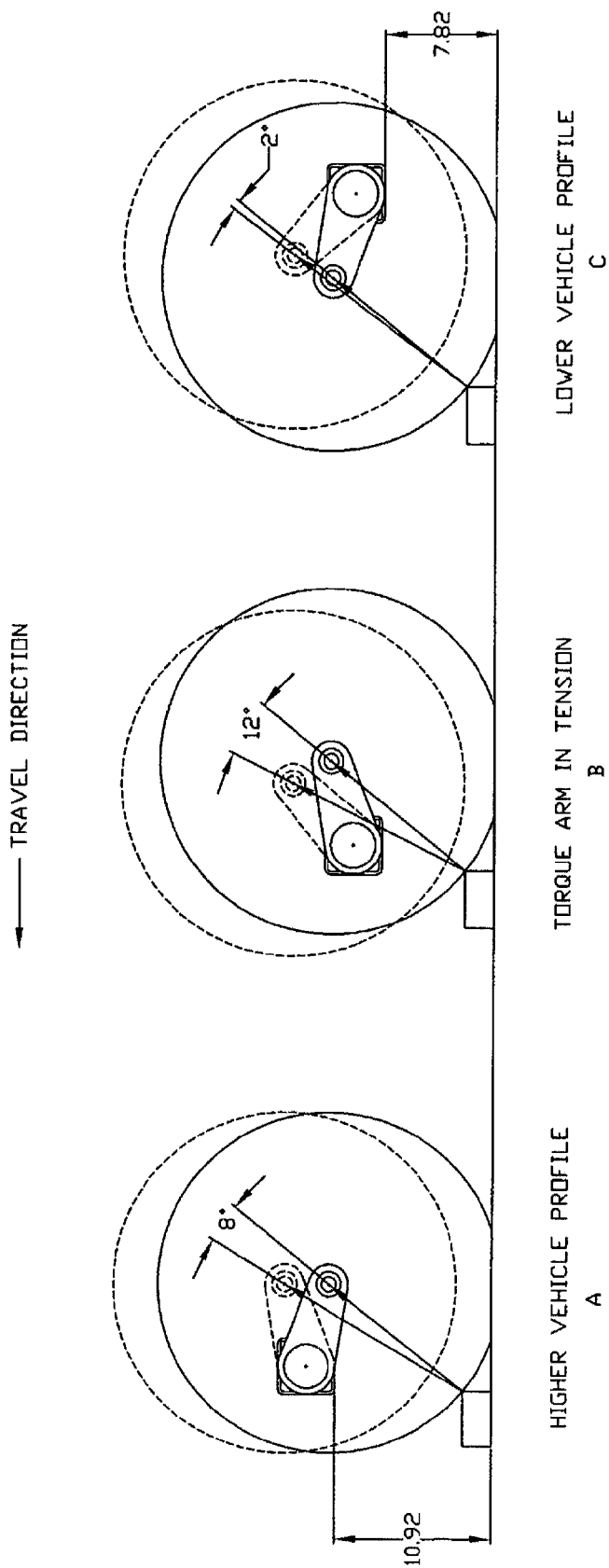
FIG. 1a is a side view of an active torque tube pivotally retaining a wheel with a higher vehicle profile.
FIG. 1b is a side view of an active torque tube pivotally retaining a wheel with a torque arm in tension.
FIG. 1c is a side view of an active torque tube pivotally retaining a wheel with a lower vehicle profile.

The novel approach is to have a leading torquearm multiple torsion bar cartridge suspension system, resulting in a much lower CG position, as in FIG. 1C. Further, the ride quality significantly increases because the obstacle impact vector is directed more perpendicularly to the axle pivot center. This causes the torsion axle to be fully loaded in desired operation and the torquearm not experiencing tensile loading. There are significant frame profile, operational, and performance differences between FIGS. 1A and C.

For a torsion axle to perform as derived above, it has to have some bearing method to exhibit maintaining and operating desired wheel position without agitation, especially from oncoming impact. Typical rubber torsion axles, for example, generally locate the pivoting center bar among compressed rubber cords, resulting in several floating movements upon impact. This increases forward wheel agitation from impact to where the vehicle undesirably wanders side to side over the road. These manufacturers prohibit leading torquearm designs in application.

Prior art for multiple torsion bar cartridge designs establishes a single and short bearing to permit torsion action oscillation from the mating torque hub. In practice this bearing surface is more a pivoting fulcrum for the whole assembly and having to maintain wheel leaning camber forces by itself, generally quickly failing.

The novel approach is to have a spaced pair of aligned bearings that will centrally locate an extended torque hub, accept required loads, and maintain desired wheel camber position. A long single bearing could be used, but is generally more expensive and increases weight for the loading gain.

Figure 2:
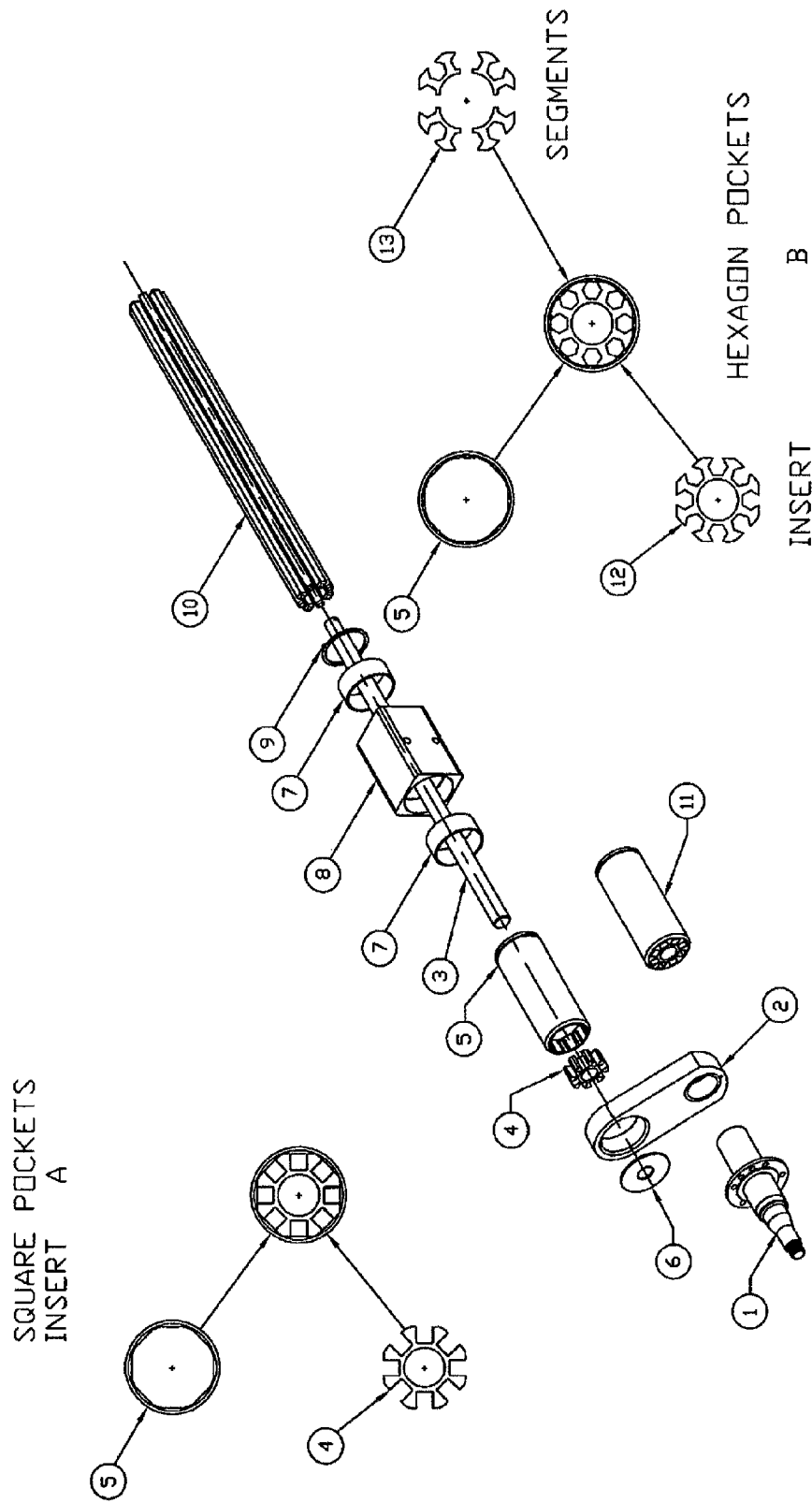
FIG. 2 is an exploded perspective view of an active torsion cartridge.

In FIG. 2, to secure and align a pair of torque hub bearings 7 while maintaining spacing, an extended bearing housing 8 with abutting shoulders is required. Each hub bearing 7 is securely pressed into the mating housing 8 bore and seated against spaced shoulders. The bearing housing 8 outer configuration matches the enveloping axle tube with a loose fit to permit required placement.

This novel design provides a multiple torsion bar cartridge suspension system with a leading torquearm attached to an extended torque hub 19, oscillating within a pair of spaced bearings 7 that are secured and aligned in a bearing housing 8, will support and maintain wheel camber position in a low profile application.

Combination Torque Hub

Prior art has a single piece torque hub that not only drives multiple torsion bars, but also the outer diameter is a short bearing journal to allow required oscillations in operation. In practice the short bearing is more of a pivoting fulcrum for the whole assembly in having to maintain wheel leaning camber forces by itself and soon fails.

This is easily corrected with a well extended outer journal diameter on the torque hub and having spaced bearings that will properly support wheel camber loads and desired wheel camber position. The torque hub is an expensive item to manufacture with the numerous machining operations, especially the required number pocket broachings, usually done individually. Then again much greater with a recessed extension, for compact and light weight assembly, is included for the one piece design. Approximately 60-70% of the blank material is removed by machining to complete a functioning recessed torque hub with extended journal diameter.

The novel approach is to have a combination of two or more pieces to result in an equivalent configuration that will equally function. The common item in this assembly is the torque tube 5, simply made from a tube blank with minor machining. At the torque end opening, a uniform geometric configuration, sides equal to the torsion bar number, is machined a specific depth. The machined depth establishes uniform stops. The opposite end opening has a simple relief bore for the twisting torsion bar clearance and ends short of the uniform depth stops. Thus, simple machining operations with minimal material removal is achieved.

Torque inserts 4 & 12 can be a single piece or multiple segments 13, and extruded and cut to size, powdered metal cast, and the like with the majority of sides that will form the torsion bar pocket. For example having square torsion bars, single torque insert 4 has three of the four sides formed for each pocket and equally spaced about the periphery, as in FIG. 2A. In a case for using hexagon torsion bars, it may be best to have four equal segments 13 that will mate at inner faces to create a combined insert, as in FIG. 2B. This method significantly costs less than any single piece requiring numerous machining operations and broached pockets.

The interchangeable torque inserts 4 & 12, or combined segments 13, are intimately pressed into the machined geometric end of the torque tube 5 and abuts the depth stops, with all surfaces flush at the end face. The example square pockets are formed from the three sides in the insert and the machined wall in the torque tube.

This novel design provides a multiple torsion bar cartridge suspension system with an intimately assembled torque hub in being significantly less in manufacturing cost and allows interchangeable inserts and combined segments for different torsion bar sizes and geometric configurations in a mating common torque tube.

Active Torsion Cartridge

Multiple torsion bar cartridges typically operate from a fixed position by the countertorque hub restrained in mating axle tube, allowing the torsion bars to function as the wheel follows terrain surface variations. If the torsion cartridge were in a no load condition and the countertorque hub could be rotated, the whole assembly would simply rotate within the held fast bearing housing. Thus, the wheel would be repositioned equally as the countertorque hub is displaced.

Prior art for on-demand active multiple torsion bars in cartridge form suspension system and actuation is unavailable, and none is currently marketed and available for use.

The novel approach is to have an oscillating countertorque hub that on demand uniformly and collectively displaces multiple torsion bars that in turn drives and equally displaces the opposite cartridge end torquearm with attached wheel. Further, existing multiple torsion bar cartridges with fixed countertorque hub can be easily converted to become an active multiple torsion bar cartridge.

Figure 3:
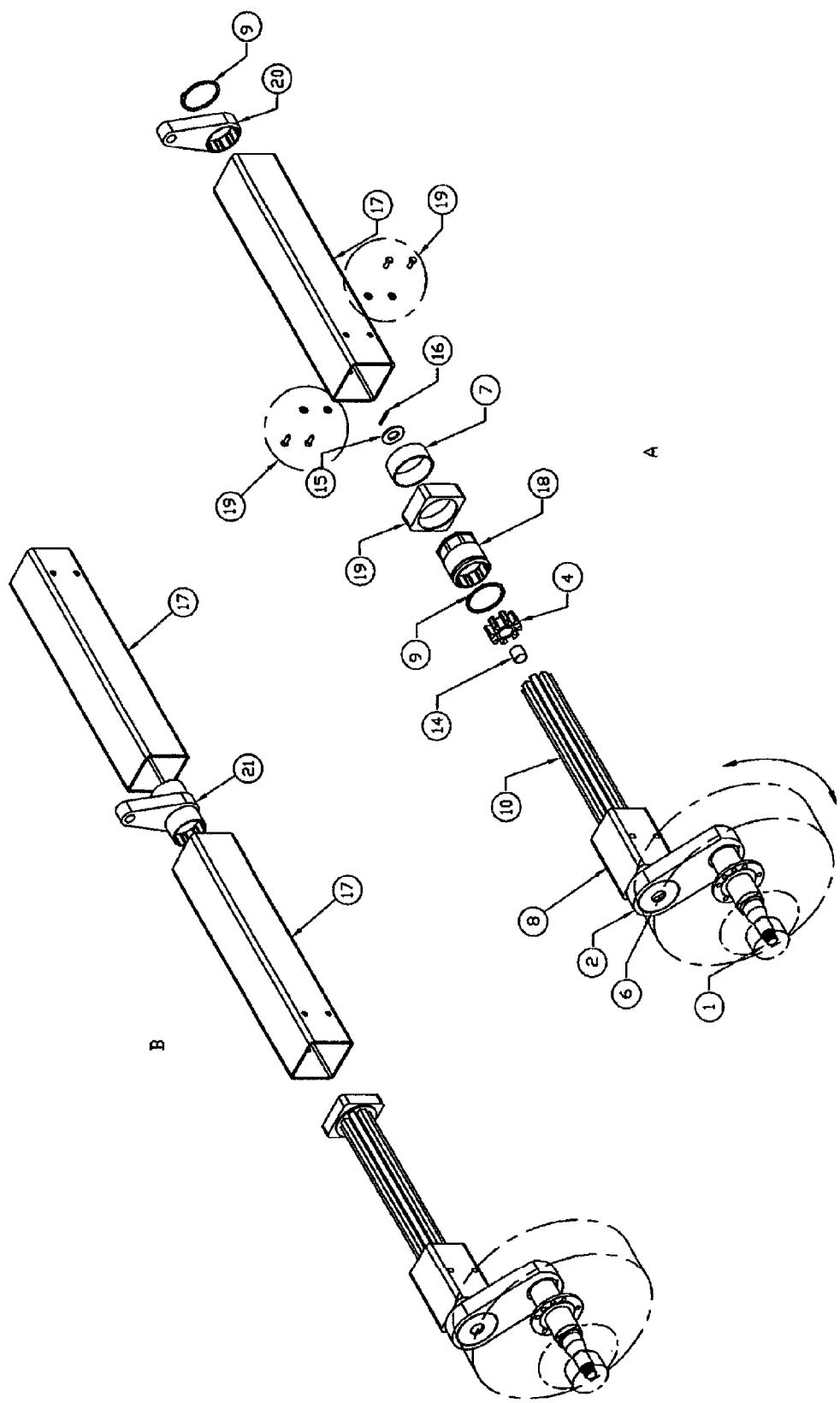
FIG. 3a is an exploded perspective view of a tag active torsion cartridge with two axle tubes.
FIG. 3b is an exploded perspective view of a tag active torsion cartridge with a single axle tube.

In FIG. 3A the active torque tube 18 subassembly begins with drawbar bearing 14 securely pressed into torque insert 4 bore. Torque insert 4 is intimately installed into mating active torque tube 18. Active torque tube 18 exhibits a finished circular section at the inside end and an outer machined configuration matching the torque insert 4 on the outer end to maintain material wall thickness and load carrying capacity. When the two surfaces meet, multi-point shoulders are created for future use. Retaining ring 9 is installed into mating groove in torque tube 18 inside end.

The active torque tube bearing 7 is securely pressed into bearing housing 19 bore and protruding as desired for thrust loading. Opposite end of protruding thrust bearing is carefully aligned with active torque tube 18 machined configuration and torque tube bearing 7 slides fully onto its diameter and abuts retaining ring 9.

Torsion bar 10 is introduced into a mating torque insert 4 and active torque tube 18 pocket. The torsion bar 10 continues passing thru and introduced into lower torque hub and seated against inside end cap 6 face. Desired remaining torsion bars 10 are installed the same way. End washer 15 is placed over drawbar 3 machined end and followed with roll pin 16 driven into drawbar 3 cross hole to secure cartridge assembly. There are other fastening methods to retain the end washer 15 onto drawbar 3 machined end. The torsion cartridge assembly is now complete and torsion bars 10 are allowed slight linier floating movement, limited by end cap 6 and end washer 15.

The inner bearing housing 19 end of the torsion cartridge assembly is introduced into loose fitting axle tube, then pushed inward as the same size bearing housing 8 continues until outside face is flush with axle tube 17 end. Lock washers and bolts 19 are installed into respective holes and securely tightened as desired to complete installation.

Actuator arm 20 has intimate mating end that is oriented as desired in relation to spindle position and slides onto exposed active torque tube 18 end configuration and abuts multi-point shoulders. Retaining ring 9 is installed into mating groove in active torque tube 20 end to secure.

As the torsion cartridge actuator arm 20 is radially moved, pivoting along both bearing housing 8 and 19 axis, the wheel is equally displaced at the opposite end. This feature allows desired wheel radial positioning on demand, resulting in vehicle profile height change from ground. Also, with the wheel lowered more than transport position, the axle load capacity increases due to cosine function. After active wheel repositioning, torsion bars 10 are performing typical independent suspension system properties.

An active axle can be assembled with a pair of aligned multiple torsion bar cartridges in a common jointed axle tube 17 with an interconnecting and common active arm connector tube 21, as in FIG. 3B. With a torsion cartridge securely installed in an axle tube 17, the other torsion cartridge is introduced into the opposite opening and slid into the tube to expose half the bearing housing 8. Between axle tubes, active arm connector tube 21 is introduced to intimate mating configuration on secured torsion cartridge active torque tube 18. The unsecured torsion cartridge is eased inward to introduce its active torsion tube 18 end into the mating active arm connector 21 end. When the other torsion cartridge is secured, the entrapped active arm connector 21 will operate both multiple torsion bar cartridges simultaneously in the same direction.

This novel design ascends the fixed multiple torsion bar cartridge to become an on-demand active unit in compact form as an independent single cartridge, or a pair in a commonly operated axle design, that results in desired wheel repositioning while maintaining suspension properties.

Self-Dampening Torsion Bars

Prior art does exist on multiple torsion bar cartridges with the bars spaced about the pivoting neutral axis. However, they all fail to address or disclose any related dampening attribute.

The novel approach to multiple torsion bar cartridge suspension systems is having self-dampening identified and a resulting factor and the ability to calculate predetermine desired performance in an application and using it in practice.

Figure 4:
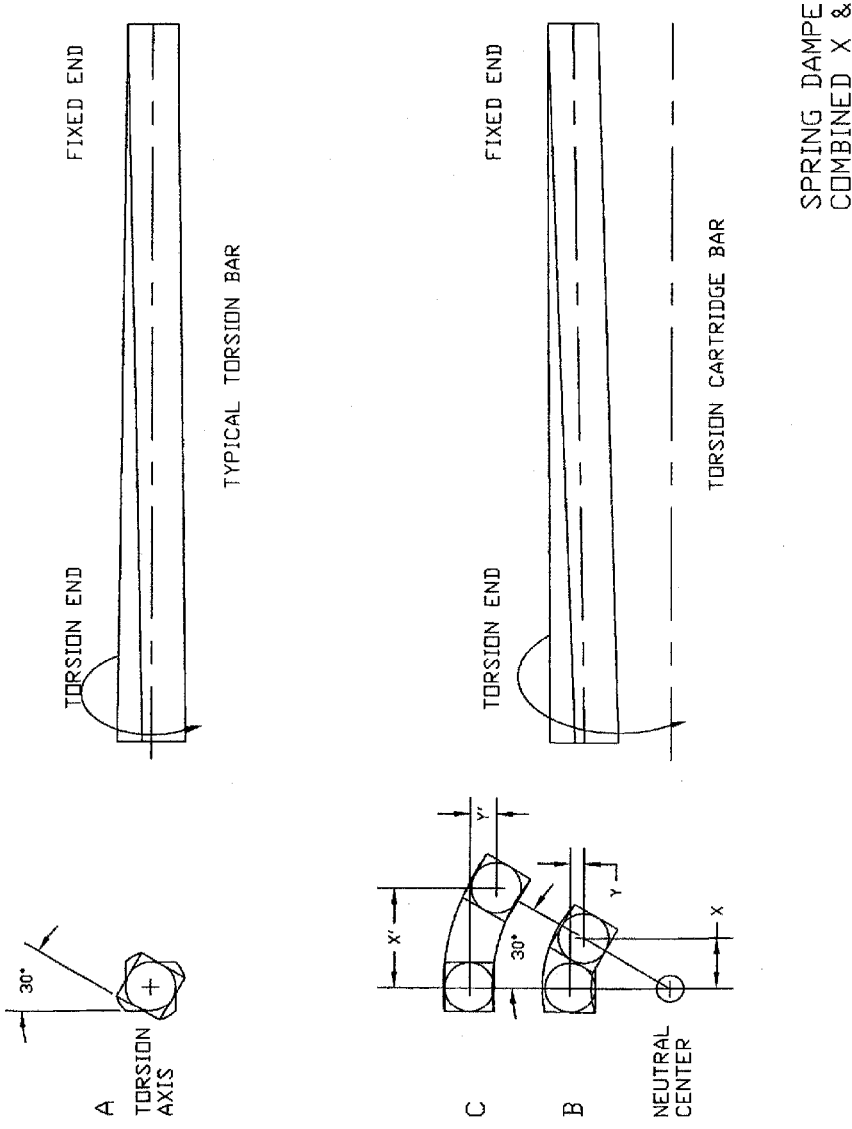
FIG. 4a is an end view and a side view of a typical twisted torsion bar.
FIG. 4b is an end view and a side view of a twisted torsion cartridge bar.
FIG. 4c is an end view of a twisted torsion cartridge bar with greater damping.

FIG. 4A illustrates the typical torsion bar that is twisted along its centerline for the whole length in displacing 30 degrees. Hooke's Law states that as a bar experiences induced torsion without friction, it will not decay in function. If a pendulum were attached to one end supported at both ends with anti-friction bearings and the pendulum were set in motion, the pendulum would stay in motion for numerous cycles until parasitic loads would eventually bring it to rest. To condition this oscillating operation for effective use, such as vehicular ride quality, a dampener is attached to retard operation in one direction to decay bar within a few cycles.

FIG. 4B illustrates the same torsion bar, but now it pivots about a distant neutral axis as it displaces 30 degrees for the length. Being the same bar and displacement, it exhibits the same absorbed torque value. However, it also exhibits related bending forces in the X and Y directions from its initial rest position. The bar is twisting and also bending in two other directions. These bending forces can now be calculated from typical design tables and mathematical formulas to result in true dampening forces and allows the designer to predict performance for a given design assembly.

FIG. 4C has the same torsion bar displaced the same 30 degrees, but the pivoting neutral axis is now twice the distance. Again the absorbed torque value is the same, but the dampening forces X' and Y' are twice as great, resulting in equally greater dampening effect. Again allowing the designer to predict performance in a design.

Further, if the torsion bar displacements were only 15 degrees, the X and Y bending forces would be proportionally reduced. If the torsion bar displacements were extended to 45 degrees, the X and Y bending forces would be proportionally increased. And because there are no external devices that require some lag-time to affect, such as shock absorber porting, the dampening effect is instantaneous. Therefore, the related properties are having instantaneous and proportional dampening to induced load. With multiple torsion bars in a cartridge assembly, the bars are uniformly and simultaneously contributing to the proportional self-dampening.

This novel design provides multiple torsion bar cartridges with internal and proportional self-dampening that ascends the assembly design from simple springing to a predetermined and compact performing vehicle suspension system.

8 Factor Suspension Design

Prior art multiple torsion bar cartridges cite basic design factors that contribute to design and performance, yet do not address or disclose remaining essential factors for true suspension system design capability.

The novel approach is having all the related factors available for the suspension system designer to accomplish the desired properties and performance with given parameters and restraints in a particular application. This is often very difficult to do in having to collect and match various interacting devices, such as springs, shock absorbers, anti-sway bars, and the like. This novel approach allows for designing a complete suspension system in compact cartridge form and requiring less space, weight, and cost to typical suspension systems.

Figure 5:
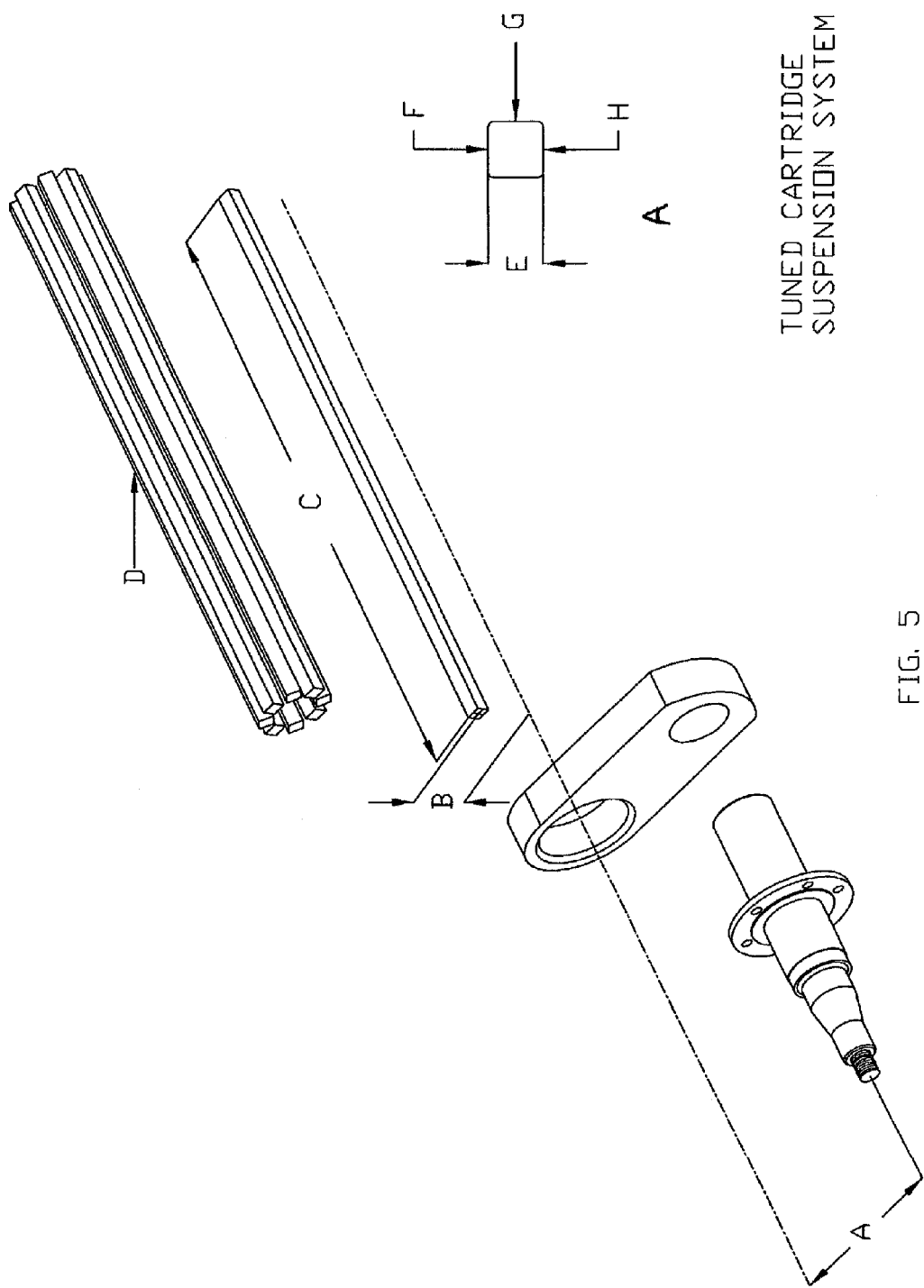
FIG. 5 is an exploded perspective view of a portion of a tuned cartridge suspension system.

Referring to FIG. 5, the torquearm radius A determines the induced torque to the rest of the suspension system and wheel position. The longer the radial sweep made by the spindle, the softer the ride for the same torsion system capacity. Thus, input torquearm radius can be varied as desired for particular performance.

The torsion bar placement radius B not only allows for multiple torsion bars placed about the neutral center for desired load capacity, but also determines the amount in suspension dampening. Thus, the torsion bar radius can be varied as desired for a particular dampening capacity.

Effective torsion bar length C is that subjected to induced loading, so that the longer the length, the lower the capacity for the same displacement. Also, the longer the length, the greater the displacement. Thus, torsion bar length can be varied as desired for a particular load capacity and displacement in performance.

The number of torsion bars D used in a compact torsion bar cartridge determines the collective load capacity. Further, several torsion bars can be equal to one larger in size and longer bar. Thus, the number of torsion bars can be varied as desired for a particular load capacity.

Torsion bar section size E experiences loading based on shear stress for a given sectional area. The greater the torsion bar section size, the greater the capacity for the same material. Thus, the torsion bar sectional size can be varied as desired for a particular torsion capacity.

Torsion bar geometric configurations F are numerous and commercially available. One configuration can provide a more desirable performance than another for a given section size. Thus, the torsion bar geometric configuration can selected as desired for a particular torsion capacity.

Torsion bar materials G are numerous and offer various and different attributes to the torsion bar cartridge design. One application requires lighter weight and another prevents corrosion accumulation. Thus, the torsion bar material can vary as desired for a particular operational performance.

Torsion bar materials may require processing H for desired attributes in the torsion bar. One application may require heat-treating for greater elasticity, whereas another requires shot-peening the surface for longer life. Thus, processing or conditioning torsion bar materials can vary as desired for a particular operational torsion performance.

This novel design having 8 factors that combine and contribute in developing a particular multiple torsion bar design in cartridge form that performs as desired in an application with optimum performance for a complete suspension system. The designer now has the ability to create and tune a suspension system from them.

Axle Tube in Frame

Prior art does not exist for multiple torsion bar cartridges that install and remove on demand from an axle tube that is mounted within the vehicle frame. Typical torsion axles mount below the frame with mounting brackets or apparatus.

The novel approach is to have the torsion axle tube mounted within the vehicle frame to not only be a housing to secure a pair of torsion cartridges, but also becomes an integral and structural crossmember that significantly strengthens the frame. Further, the chassis and CG are now much lower to the ground for increased stability and decreased roll-effect.

Figure 6:
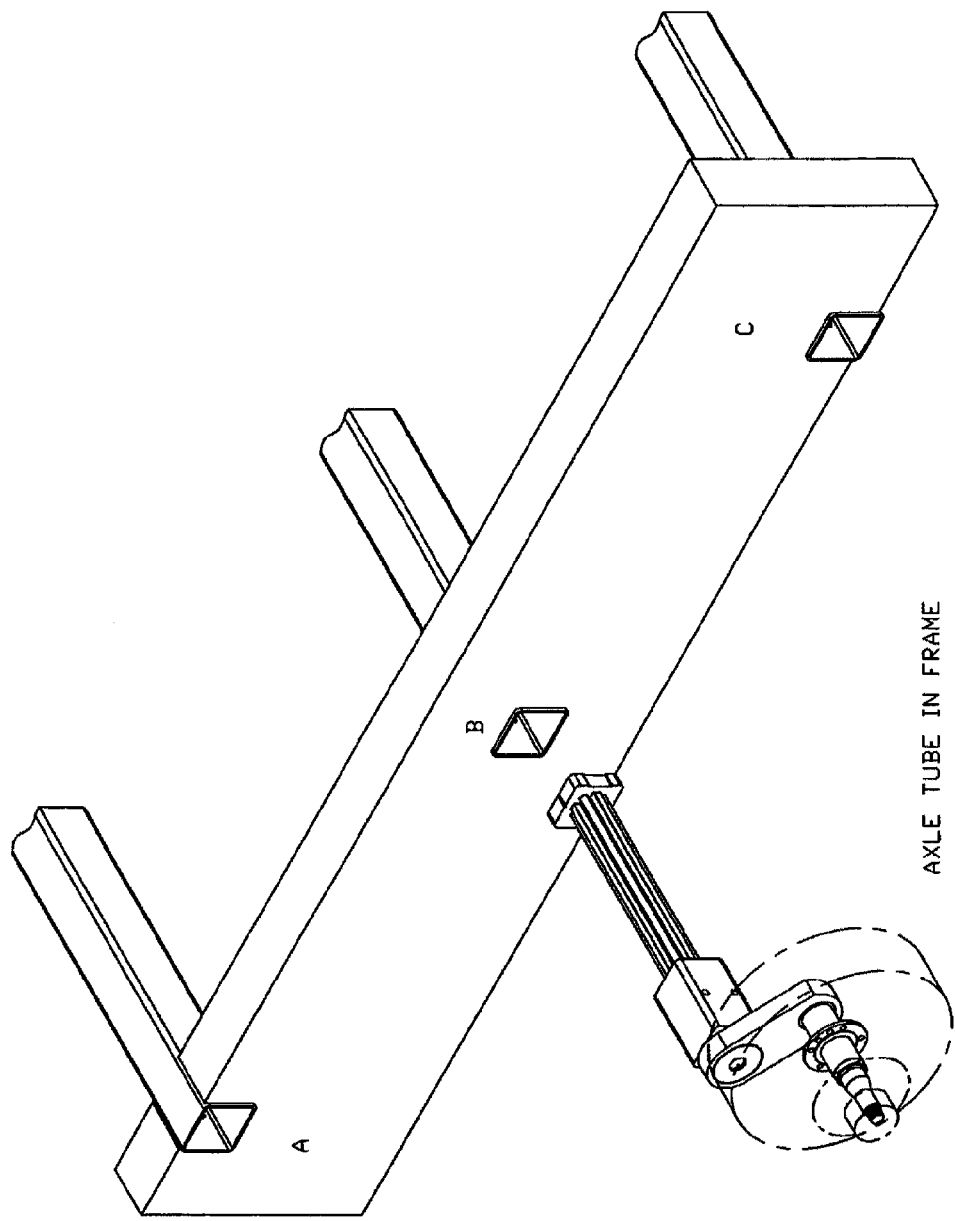
FIG. 6 is a perspective view of a torsion cartridge before insertion into an axle tube in a frame.

FIG. 6 illustrates torsion cartridge receiving axle tubes securely welded within each chassis frame rail. With the frame rail notched at top in A, the axle tube also becomes a flush surface supporting or securing crossmember for some vehicle platforms. Frame porthole mounting B provides frame rail neutral centerline support. Bottom notching the frame rail provides attachment for low mountings, marine trailer side bunk and center keel roller supports for example. Further, each respectively increases the chassis height from the ground.

This novel design provides multiple torsion bar cartridge suspension systems with the axle tube secured within vehicle frame rails, resulting in significantly lower profile, increased frame rigidity, and an integral structural crossmember that can support platform and attachments.

Torquearm Drive Modification

Prior art is unavailable for a multiple torsion bar cartridge suspension system providing vehicular drive, and none is currently marketed and available for use.

Figure 7:
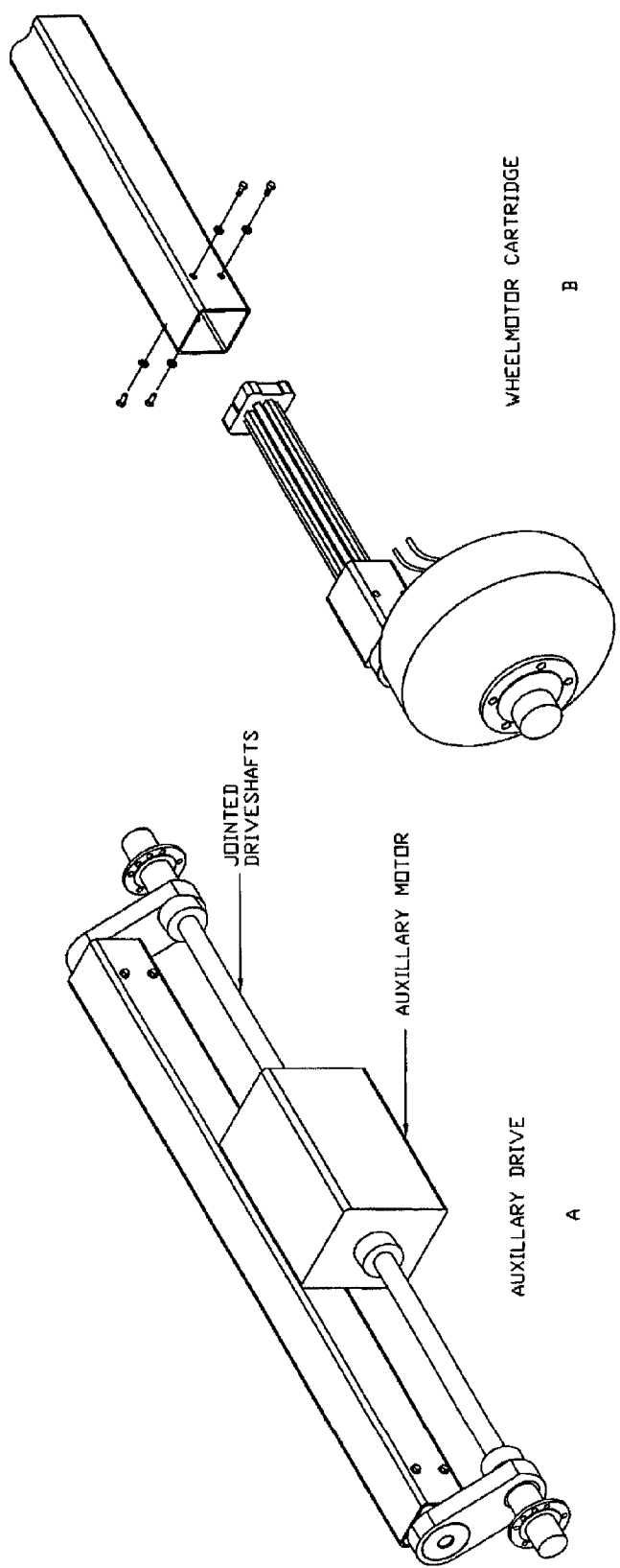
FIG. 7a is a perspective view of a torsion bar cartridge suspension system.
FIG. 7b is a perspective view of a wheelmotor securely mounted to a trosion cartridge torque arm in lieu of a typical spindle.

The novel approach is for the typical multiple torsion bar cartridge suspension system that can be modified to provide prime or auxiliary wheel or track drive to a vehicle chassis. FIG. 7A illustrates a torsion bar cartridge suspension axle with a traction motor in the middle. Universal joint stub driveshafts deliver rotary drive to each torquearm drive hub. Each drive hub operates within a torquearm mounted bearing apparatus in lieu of typical spindle. In the event of service and the like, each torsion cartridge easily removes on demand from the axle tube, disengaging the jointed driveshaft at the drive hub.

FIG. 7B has a wheelmotor securely mounted to a torsion cartridge torquearm, in lieu of typical spindle, which easily installs and removes on demand as a complete assembly from an axle tube. A particular feature to this design is that wheel drive is independent from any other.

In both cases, the motors can be hydraulic, electric, and the like, and provide the vehicle designer a compact drive and suspension system. Further, it allows trailers now to have auxiliary drive to aid-assist towing vehicles, especially in rugged terrain. Existing trailers can be retrofitted with either drive system to improve versatility.

This novel design extends the multiple torsion bar cartridge from idler wheel function to provide vehicle shaft or wheelmotor drive to supporting wheels.

Torquearm Steering Modification

Prior art is unavailable for a multiple torsion bar cartridge suspension system providing vehicular steering, and none is currently marketed and available for use.

Figure 8:
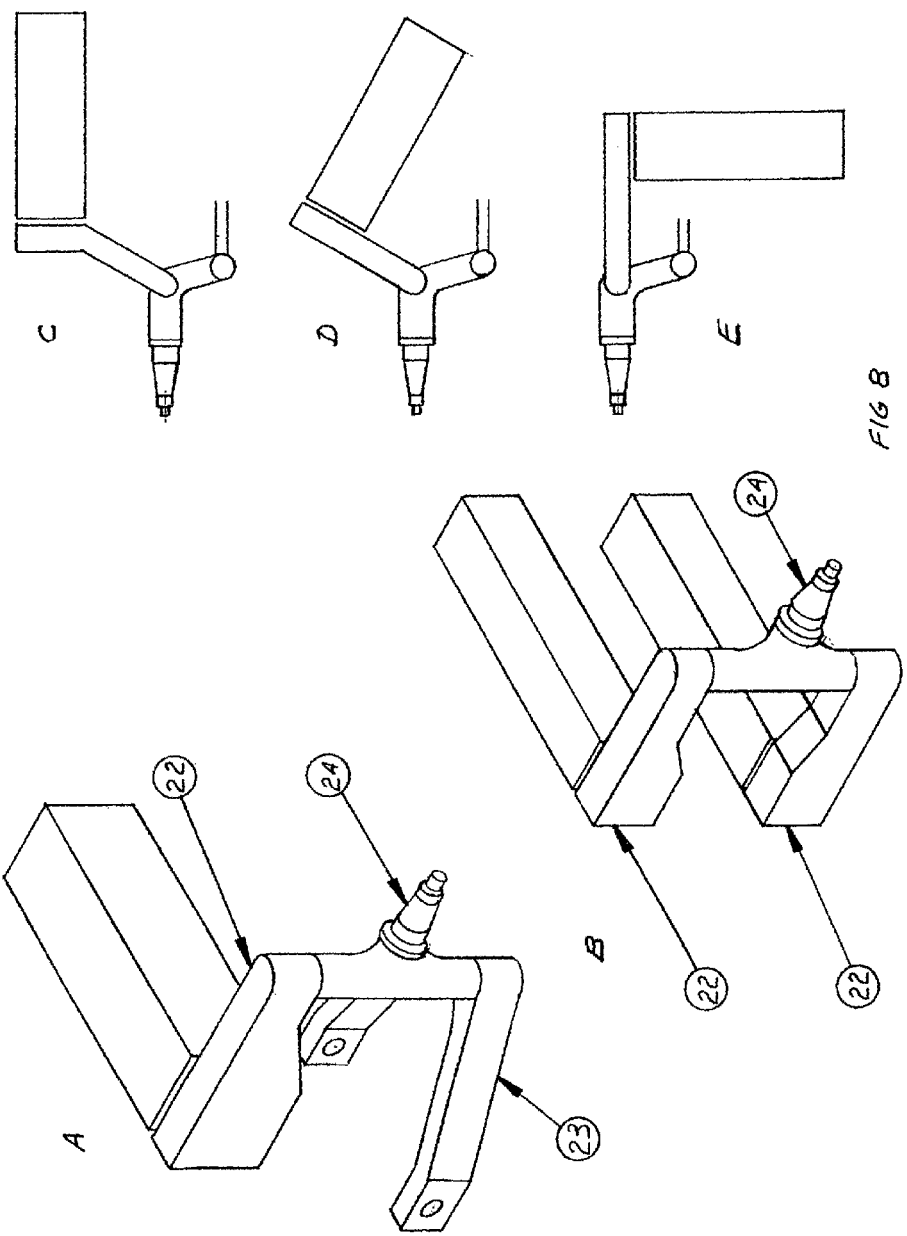
FIG. 8a is a perspective view of an upper single torsion cartridge with steering torque arm.
FIG. 8b is a perspective view of upper and lower torsion bar cartridges with a ball joint steering torque arm.
FIG. 8c is a top view of at least one torsion bar cartridge retaining an angled steering torque arm.
FIG. 8d is a top view of at least one torsion bar cartridge retaining a straight steering torque arm at a desired angle.
FIG. 8e is a top view of at least one torsion bar cartridge retaining a straight steering torque arm, which is parallel to centerline of the vehicle.

The novel approach is for a multiple torsion bar cartridge suspension system that can be modified to provide vehicular steering. FIG. 8A illustrates an upper single torsion cartridge with steering torquearm 22 and a lower A-arm 23 with upper and lower ball-joints and pivoting steering knuckle 24 between them. Steering knuckle 24 pivots horizontally to direct wheel for steering, while torsion cartridge with steering torquearm 22 end and lower A-arm 23 to provide suspension and position respectively. The situation could be reversed with an upper A-arm 23 and lower torsion cartridge steering torquearm 22 for designer consideration. In both cases the pivoting maintains desired steering inclination angle for desired suspension capacity during steering operations.

FIG. 8B has upper and lower torsion bar cartridges with ball-joint steering torquearm 22 ends and pivoting steering knuckle 24 between them. In this case, the torsion cartridges can be smaller so that both will provide equal load capacity as a single torsion cartridge. Again, the pivoting maintains desired steering inclination angle for desired suspension capacity during steering operations.

Both steering suspension designs can installed on the vehicle as in FIG. 8C with an angled torquearm to provide inside angle tire clearance and the torsion cartridge(s) perpendicular to the vehicle centerline. FIG. 8D has the torsion cartridge(s) at a desired angle to the vehicle centerline with straight torquearms for inside angle tire clearance. FIG. 8E again has straight torquearms with the torsion cartridge parallel to the vehicle centerline.

All these configurations provide the vehicle designer with a compact torsion bar cartridge suspension and steering systems. Further, because of the unique torsion bar cartridge properties, an interacting anti-sway bar is unnecessary as reaction forces are directed along the frame rails. Typical suspensions direct reaction forces upward toward the CG, inducing roll to the chassis, thus an anti-sway bar.

Long vehicles, such as multi-wheeled trailers typically have difficulty negotiating turns because of tire and road scuffing at forward and aft axles. These tires could have aligned steerable torsion bar cartridges with a typical tie rod connecting them. As the trailer negotiates a turn, dynamic forces engage forward tires to self-steer in the turn direction as the aft tires are equally forced to self-steer away from the turn. Coming out of the turn, all tires return to neutral position from self-centering toe-in forces.

This novel design extends the multiple torsion bar cartridge from idler wheel function to provide vehicle steering capability to supporting wheels.

Composite Torsion Cartridges

Prior art is unavailable on multiple torsion bar cartridges having FRP (fiber reinforced plastic) and the like composites in part or whole assemblies.

The novel approach is having interchangeable parts for typical multiple torsion bar suspension cartridges to complete whole torsion subassemblies made from FRP and the like composites. These materials are non-corrosive, non-electrical conducting, non-heat treat and related processing, and only 40% the weight of steel, which are desired and applicable attributes over currently used stock. Further, they can be extruded and cut to size or molded subassemblies that would require significantly less machining or follow-on processing. In the event less torsion capacity is desired, the appropriate torsion bar number is cut for removal. This extends to the designer and manufacturer flexibility in production and performance.

Figure 9:
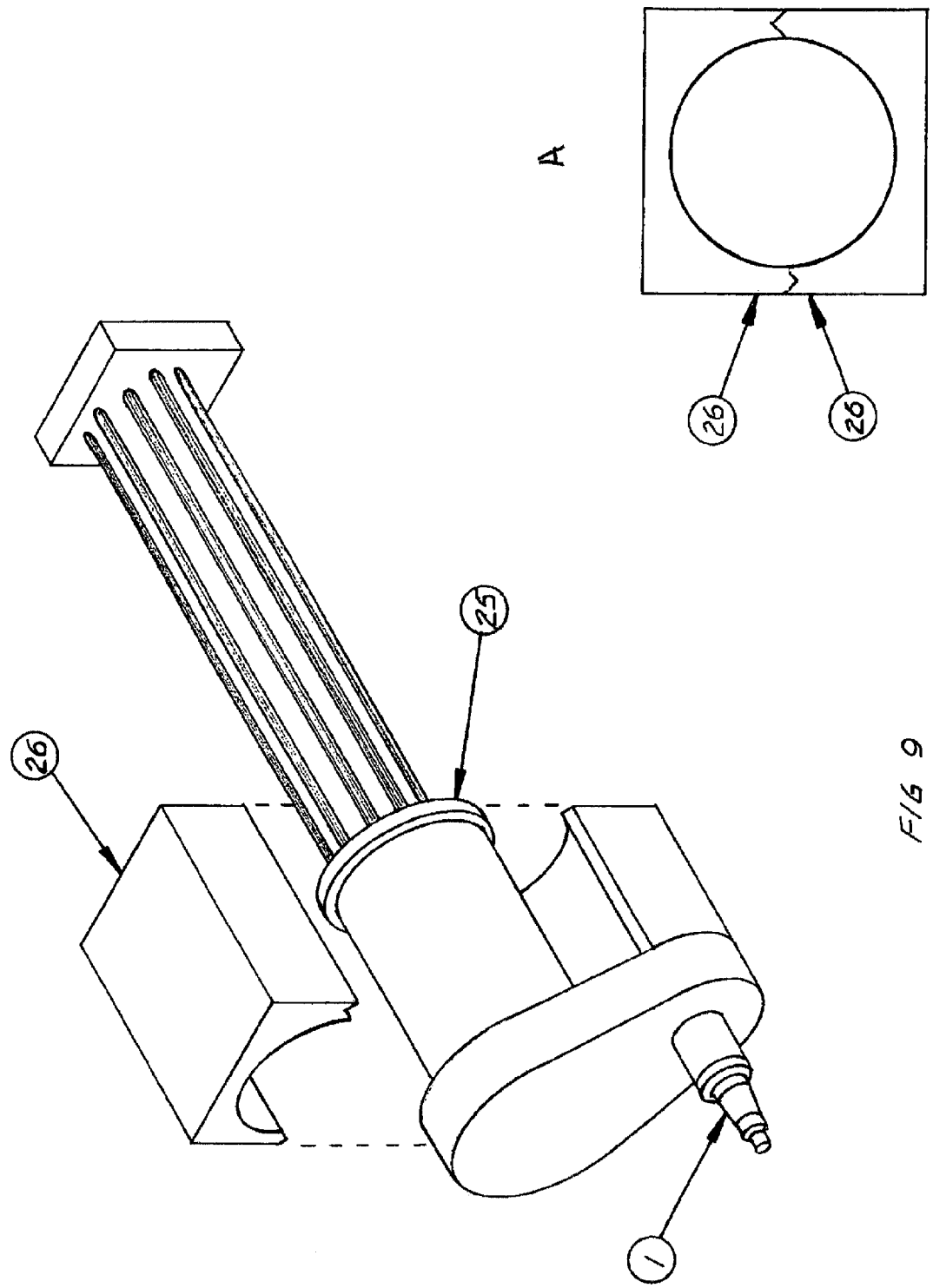
FIG. 9 is a partially exploded perspective view of an integrated torsion subassembly.

Integrated torsion subassembly 25 in FIG. 9 is molded to size and configuration, having torquearm, bearing surface, shoulder, torsion bar cluster, and mating axle tube countertorque hub in a homogeneous subassembly. Spindle 1, being steel for example, can be secured to torquearm with typical fastening. Extruded length bearing block 26 can be cut to finish size and mounting holes installed. Using a pair, one above and one below, the bearing blocks 26 intimately fit about integrated torsion subassembly 25 bearing area and both bearing block 26 mating edges engaged to maintain location. If desired, the mating bearing block 26 edges can be bonded together for greater retention.

Figure 10:
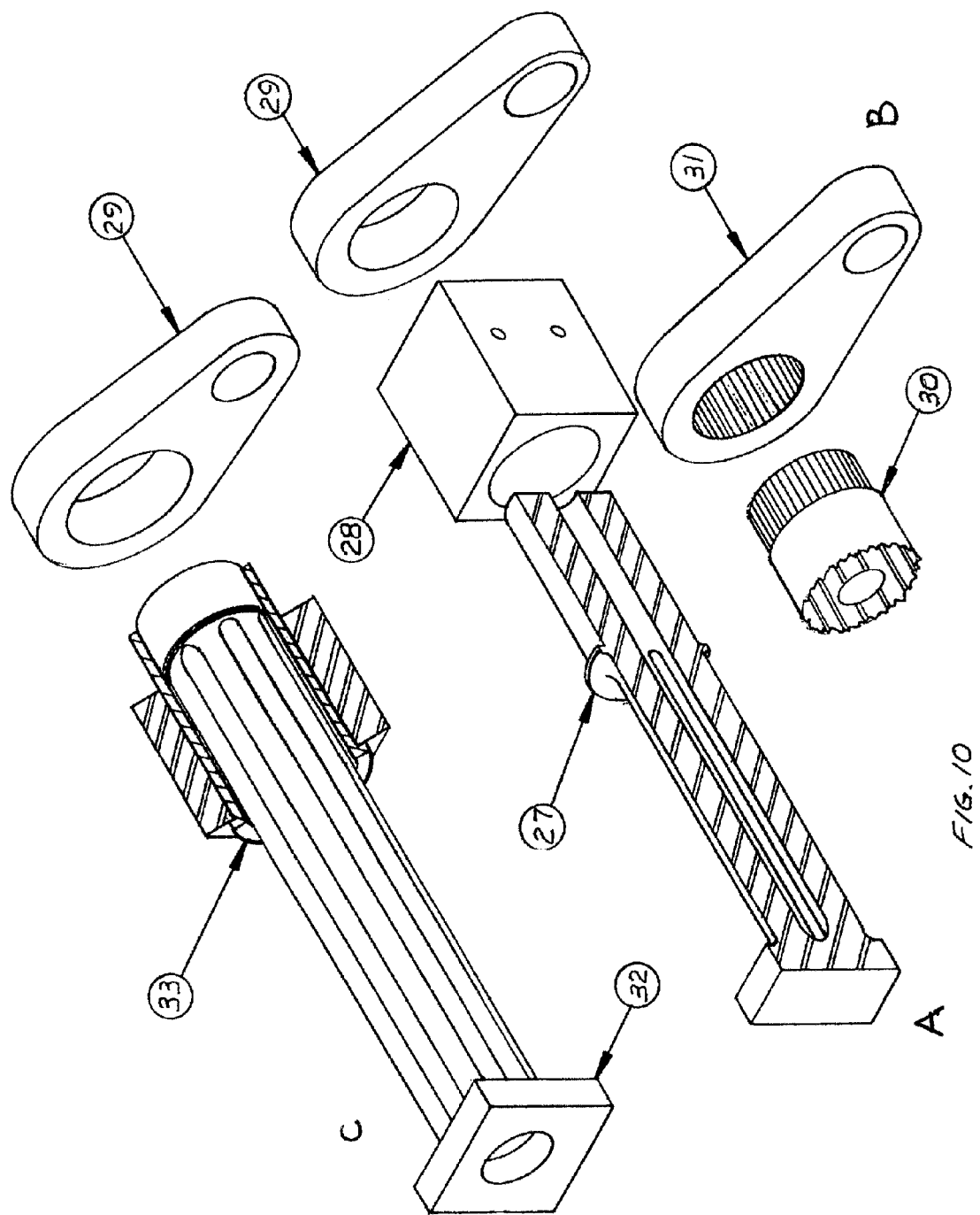
FIG. 10a is a partially exploded perspective view of an integrated torsion subassembly having a bearing housing.
FIG. 10b is an exploded perspective view of torsion element with splines and a matching torque arm of an integrated torsion subassembly.
FIG. 10c is a partially exploded perspective view of an integrated torsion subassembly having a shorter torsion element.

Another design using molded and extruded FRP composites, and the like materials, in FIG. 10A would include bearing housing 28 having intimate fit about torsion element 27 journal that extends beyond bearing housing 28 to fit inside torquearm 29. Torquearm 29 is oriented to desired spindle 1 position and securely bonded to torsion element 27 journal extension. FIG. 10B has an option to this securing by have mating splines on torsion element 30 journal end and torquearm 31 bore that would allow incremental positioning the spindle as desired. Securing the torsion element 30 and torquearm 31 can be done with bonding material or typical fastening methods. If desired, bearing blocks 26 can be used in lieu of bearing housing 28 to perform the same oscillating support function.

FIG. 10C has a shorter FRP composite torsion cartridge that can be done with torsion tube 33 securely bonded and flush to shorter torsion element 32 end. This puts the effective torsion bar length deep within the torque tube 33 length, making a significantly shorter subassembly. Torque tube 33 can be securely bonded or splined to mate with torquearm 29 and secured with bonding material or typical fastener together as desired spindle 1 position.

All of these and related other variations can be installed into axle tube 17 and pushed inward for bearing blocks 26 or bearing housing 28 end faces are flush with axle tube 17 end. Torsion cartridge is secured with typical fastening.

This novel design provides using FRP and the like composites for individual parts and complete and homogeneous subassemblies that extends numerous properties beyond typical materials with significant cost and manufacturing savings.

Active Tag Axle

Prior art is unavailable for an active multiple torsion bar cartridge suspension system used for additional chassis load capacity.

Figure 11:
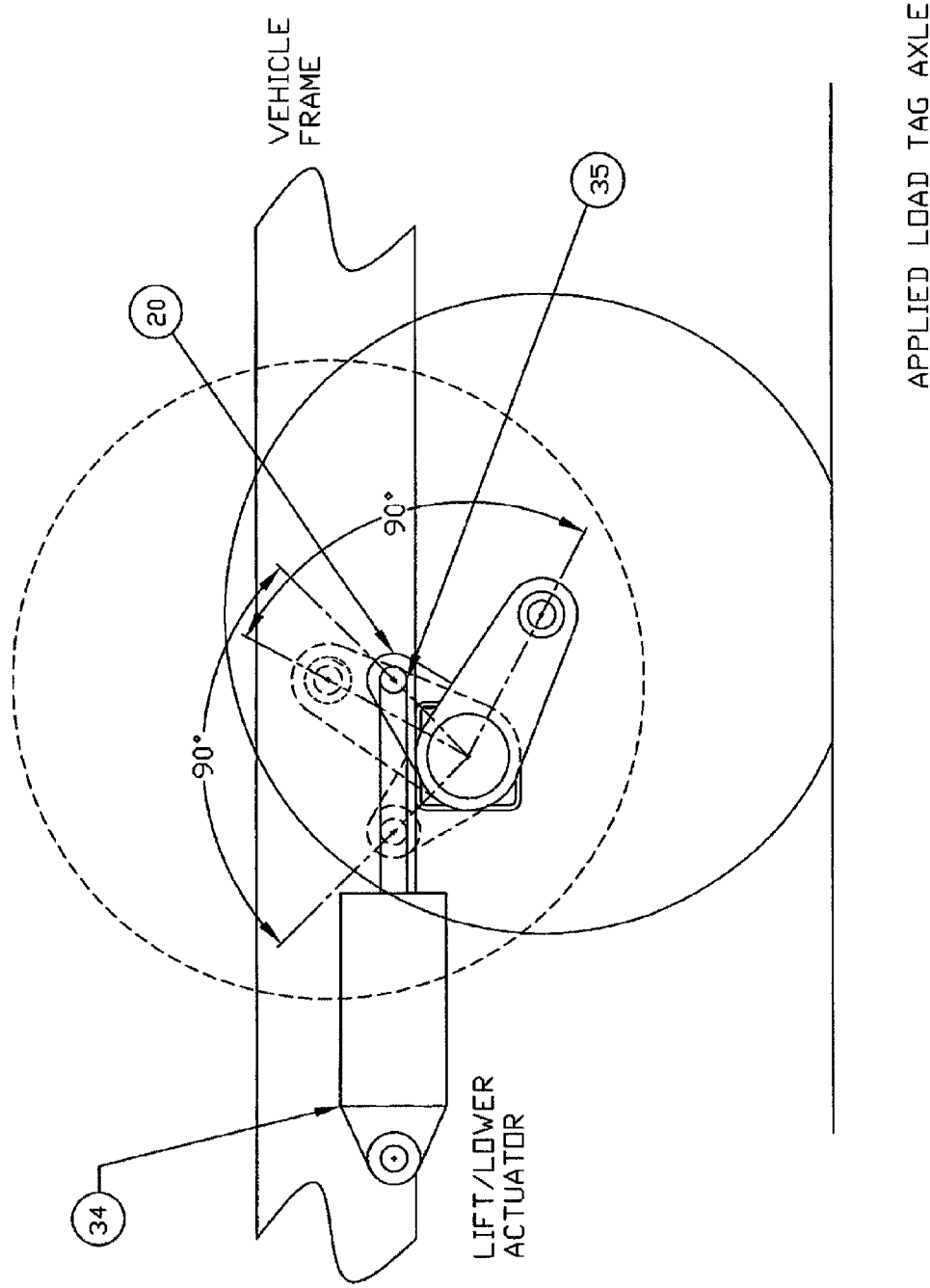
FIG. 11 is a side view of an actuator that operates a torsion cartridge actator arm to raise and lower a wheel to a road surface.

The novel approach is for an active multiple torsion bar cartridge suspension system to provide on-demand vehicle wheel lifting and lowering in a tag axle application. Now vehicles equipped with only electric or hydraulic power sources can have an operator controlled tag axle system installed and operable. FIG. 11 has an actuator 34 that operates the torsion cartridge actuator arm 20 and pivot 35 to lift and lower the wheel to and from the road surface. Extending the actuator 34 drives the enclosed torsion bars to rotate the torquearm downward, loading the wheel to the road surface, and pre-loading the torsion cartridge. This provides additional suspension capacity to the vehicle payload. Retracting the actuator 34 drives the enclosed torsion bars to rotate the torquearm upward, lifting the wheel from the road surface to transport position.

A variation to above is having one that is auto-sensing to load imposed on vehicle's other axles. A sensor monitors the desired load on vehicle driving wheels and actuates the tag torsion cartridges until a specified limit is achieved and is constantly adjusted as loading changes. This maintains vehicle manufacturer's desired chassis loading on wheels for required drive and braking capabilities.

Both cases can be retrofitted to existing vehicles and installed on new chassis. Also, additional active torsion cartridges can be installed for independent and incremental operation on-demand or auto-sensed.

This novel design provides an on-demand or auto-sensing operated active multiple torsion bar cartridge tag axle function to vehicles with various power sources for increased chassis load capacity and monitoring during transport.

Torsion Cartridge Equalizing

Multiple axle vehicles, such as tandem or triple axle horse trailers, typically experience either under or over loaded axles, fore and aft, that is a poor towing practice and unsafely induces side-sway during transport. Further, towing vehicle hitch height changes cause the same and other worse conditions. Very stiff and poor ride quality leaf-beam axle designs appear to be the only axle design that provides equalized axle loading.

Prior art is unavailable on a multiple torsion bar cartridge suspension system used for multiple axle chassis with a load equalizing means among them and none is currently marketed and available for use.

Figure 12:
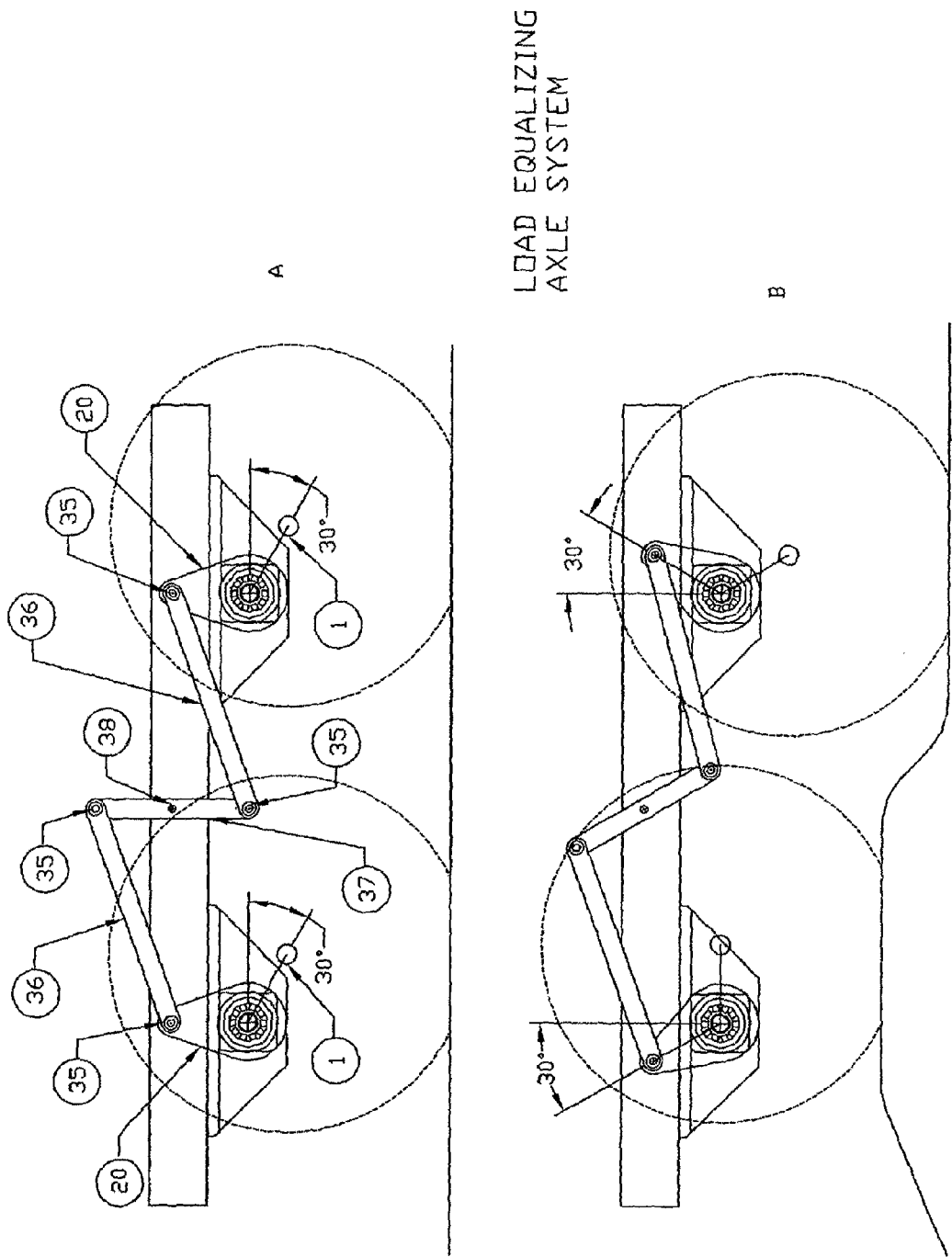
FIG. 12a is a side view of a pair of active multiple torsion bar cartridges with an equalizer link.
FIG. 12b is a side view of a pair of active multiple torsion bar cartridges with an equalizer link over an equal road surface.

The novel approach is for active multiple torsion bar cartridges mechanically linked to provide desired equalized wheel loading. FIG. 12A has a pair of active multiple torsion bar cartridges per side, each having an equalizer link 36 attached to each actuator arm 20 at each pivot 35. Opposite ends of each equalizer link 34 are attached to respective ends of equalizer bar 37 at each pivot 35. Equalizer bar 37 has center pivot 38 equidistant from its pivot 35 ends. In operation, as in FIG. 12B, the front wheel and spindle 1 are rotated upward, CCW, the front torsion bars 10 drive the actuator arm 20 respectfully the same direction. This causes the front equalizer link 36 to pull in tension on the upper equalizer bar 37, which in turn causes the lower equalizer bar 37 to push in compression the rear equalizer link 36 against the rear actuator arm 20. Actuator arm 20 drives rear torsion bars 10 to rotate the rear spindle 1 and wheel downward, CW.

This simple linkage system distributes the summation of torques from the participating torsion bar cartridges to automatically and instantly result in balanced loading for axles and wheels on the road surface. The same would apply to aligned and transverse torsion cartridges having a common actuator arm connector between them having only a single linkage set. If ever desired, the equalizer bar center pivot 35 can be offset from respective ends to exhibit repeatable and controlled unbalanced loading to axles and wheels on the road surface. In lieu of mechanical linkage, the same can be achieved hydraulically, or any other similar means, with lines, actuators, and controlling valves.

Further, not only does this system provide for desired uniform wheel loading on multiple wheel vehicles, but also allows the torsion bar suspension properties to operate simultaneously, automatically, and instantly for improved ride quality. Both of these load equalizing designs can be retrofitted to existing vehicles, resulting in significantly improved ride quality and safer road manners.

This novel design provides multiple axle vehicles with active multiple torsion bar cartridges and axles to self-equalize loading and monitor during transport for safer operation and improved road manners while providing suspension properties.

Ganged Active Cartridges

Multiple wheeled and crawler tracked vehicles generally have independent suspensions that operate within limits as they maneuver over the various terrains. In some cases where the vehicle hull runs-aground, or desiring a side tilt for grade purposes, they are respectively marooned or prevented from desired operation.

Prior art is unavailable for active multiple torsion bar cartridges ganged together for uniform operation that raise and lower vehicle chassis on-demand or with auto-sensing apparatus.

Figure 13:
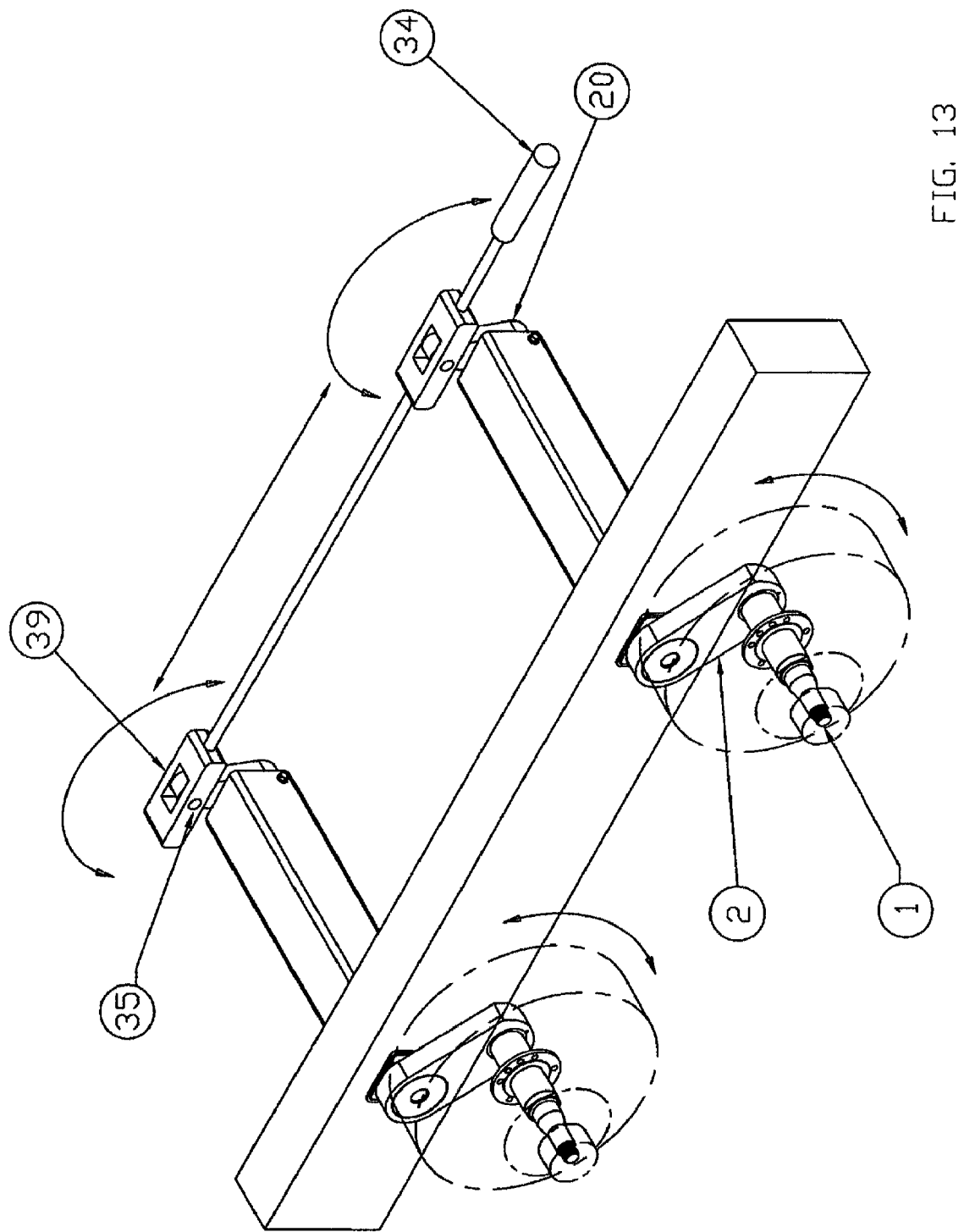
FIG. 13 is a perspective view of a pair of active multiple torsion bar cartridges gang linked at the actuator arms.

The novel approach is for active multiple torsion bar cartridges mechanically linked to provide desired uniform and simultaneous wheel or idler movement. FIG. 13 illustrates that at least a pair of active multiple torsion bar cartridges can be gang linked 39 at the actuator arms 20 to provide combined uniform and equal movement. As the actuator arms 20 are moved by an actuator 34, the torsion bars drive the torquearm with attached wheel or idler with uniform and equal displacement to raise or lower the vehicle height. Pairs of transverse and aligned active multiple torsion bar cartridges can be operated with a common actuator arm connector 21 between them, which would result in raising or lowering vehicle height.

Each actuator 34 can be controlled by on-demand or auto sensing apparatus. Further, the sides can independently operate from one another, or be combined for equal operation. This would allow vehicle tilt for grading, or lifting to clear a run-aground situation, respectively. After movement, the vehicle maintains using torsion bar cartridge suspension properties.

This novel design provides multiple wheeled and crawler tracked vehicles with active multiple torsion bar cartridges in unison to raise and lower on demand or auto-sensing operation to change the chassis height or independent side tilt while performing suspension properties.

Integrated Active Suspension

Modern automotive vehicles have 4 wheel independent suspensions for performance and better handling then those that do not. Any slight turn to complete cornering at posted speeds causes the vehicle to pitch in opposite direction to the turn. This is due to the vehicle mass-shift in that direction and putting additional loading to the outside wheel suspensions, while the inside turning wheels are unloaded. Passengers are also pitched, often unpleasantly.

Prior art for a vehicle equipped with active multiple torsion bar cartridge suspension at each wheel that is integrated with auto-sensing apparatus to monitor and correct vehicle leans and pitches is unavailable and none is currently marketed and available for use.

Figure 14:
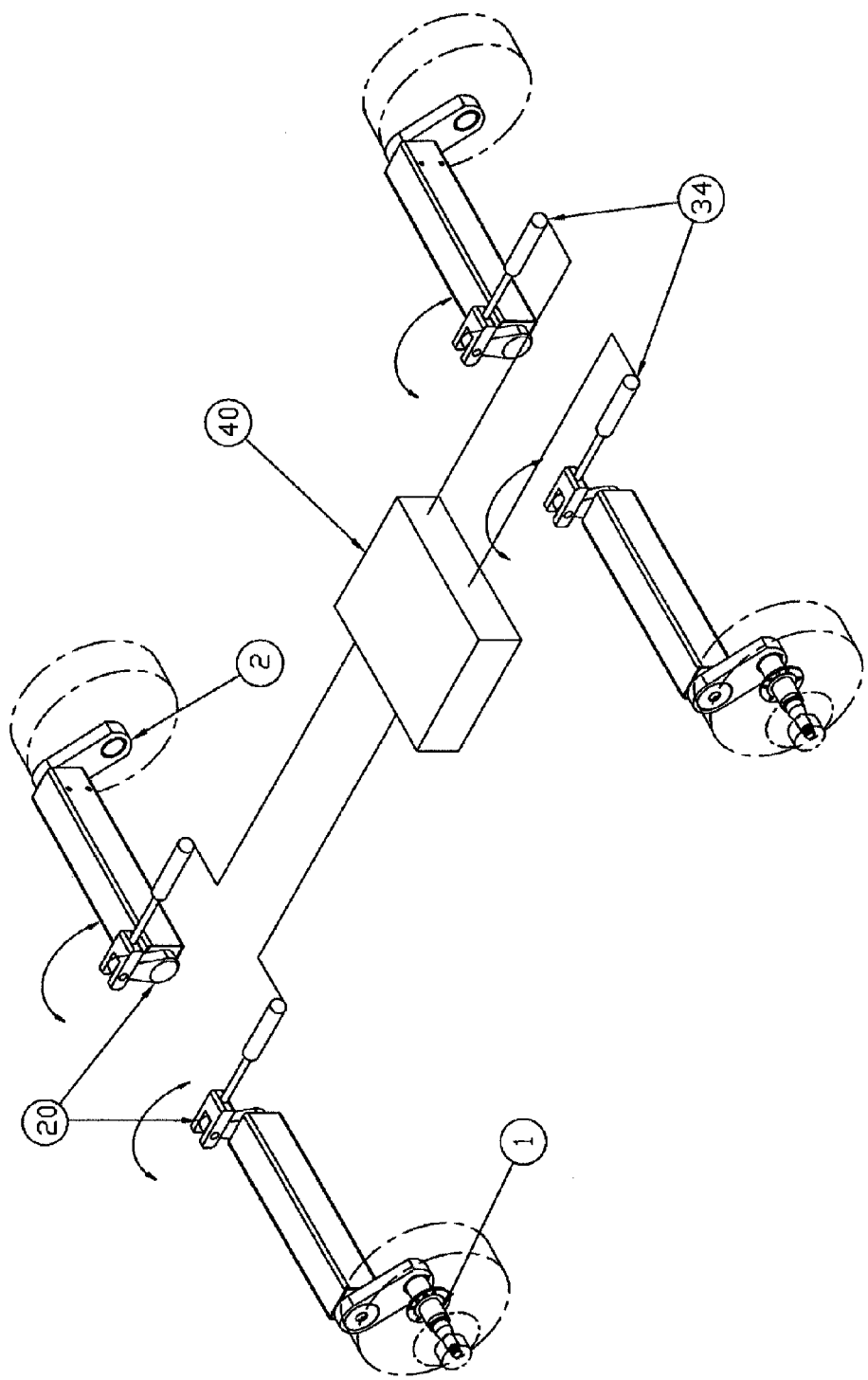
FIG. 14 is a perspective view of a vehicle wheel having an active multiple torsion bar cartridge with an actuator operated by an apparatus.

The novel approach is for each vehicle wheel to have an active multiple torsion bar cartridge with an actuator 34 attached, as in FIG. 14. The actuator 34 is energized for required operation by a power source that is controlled by an auto-sensing apparatus 40. As the apparatus 40 senses the degree of vehicle lean or pitch, it activates the appropriate actuators 34 to move the torsion cartridge suspension(s) to correct the vehicle dynamics. The operator can override the auto-sensing to lift the vehicle in clearing a road obstruction, or lower it for increased handling and stability.

For example in taking a left turn, the left side active torsion cartridges retract the wheel to lower that side, as the right side active torsion cartridges force the wheel downward to raise the right side. In another example, the right front wheel rolls into a road depression, in which the auto-sensing repositions the rear wheels in time to condition vehicle dynamics and provide a corrected ride. These corrective actions make for more comfortable passenger ride.

This novel design provides that all 4 vehicle wheels can be independently adjusted to desired and optimum vehicle dynamics with auto-sensing, and have on-demand operator override for desired performance.

Stationary & Industrial Mount Transport

Stationary industrial units, such as engine driven generators, welders, and air compressors, are typically moved about a site with dragging skid-frames, fork lift trucks, and lift from large cranes. Road transport requires very substantial truck and trailer and extensive tie-down efforts to retain in position.

Prior art is unavailable for industrial mounts with multiple torsion bar cartridge suspension for temporary transportation to, about, and from a cite.

Figure 15:
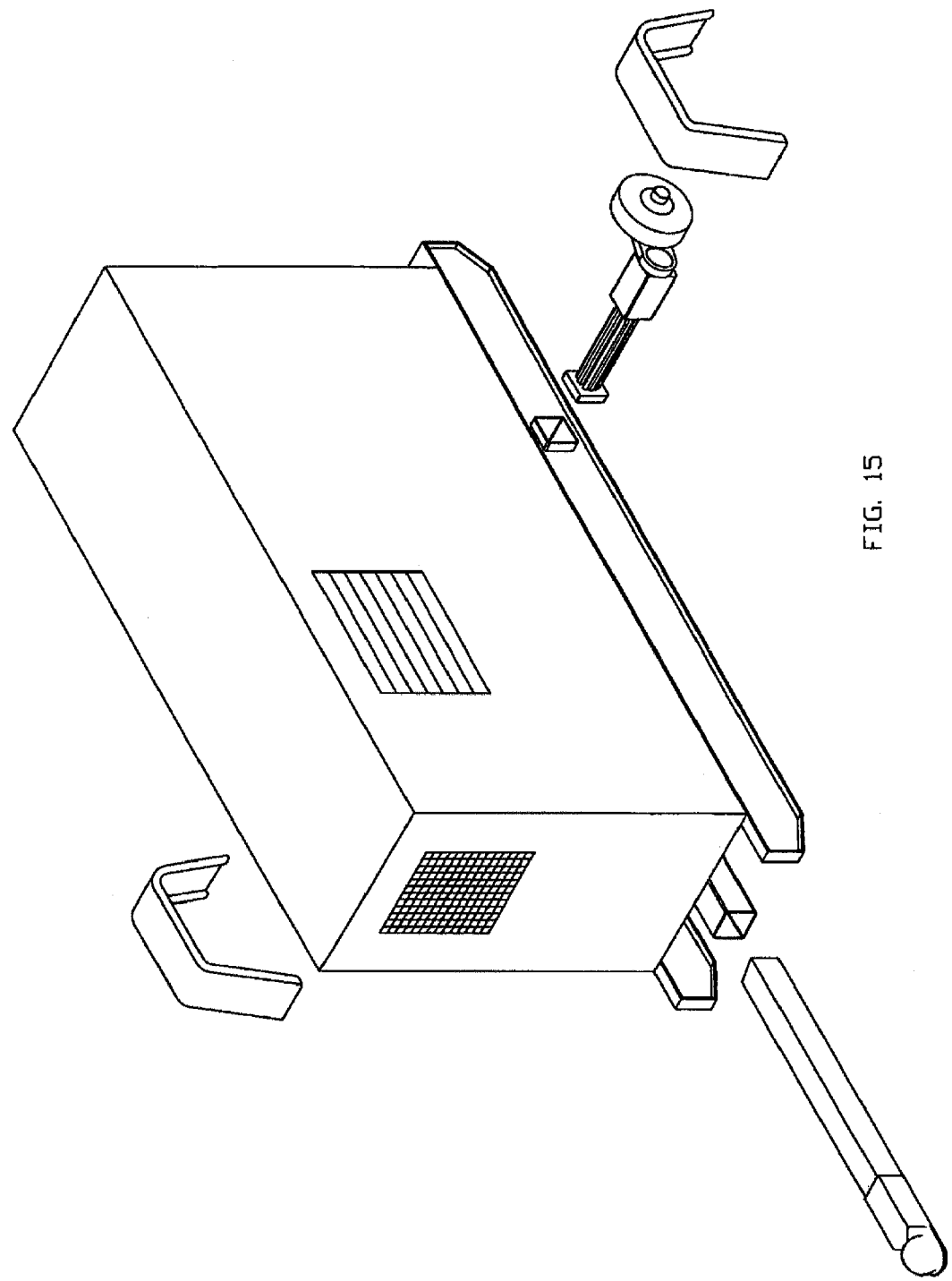
FIG. 15 is a partially exploded perspective view of an industrial unit with a pair of torsion bar cartridges.

The novel approach is to install on industrial units an axle tube thru skid frame and weld about to secure, as in FIG. 15. Into each side a multiple torsion bar cartridge is installed, quick-disconnect brakes activated, and wheels securely attached. Also, quick-disconnect hitch drawbar and fenders with tail lights are attached to allow the stationary unit legal road transport. At the desired site, trailer apparatus, wheels, and braked torsion cartridges are removed and stored, or possibly used elsewhere to interchange with another unit. Industrial unit is now stationary for running, and without wheels and suspension hubs, theft is prevented.

This torsion cartridge application easily converts stationary platforms, such as performing stages and cement mixers, into mobile units that extend products versatility and flexibility. Further, existing platforms and industrial mounts can be easily retrofitted to gain mobility.

This novel design provides typically stationary equipment and platforms easy modification for mobility and suspension when and where previously unavailable, prevents product theft, and retrofits existing units.

Manufactured Housing Transport

HUD code and modular manufactured housing are delivered to homesites on axles and wheels, permanent with frame for the former and removable chassis for the latter. HUD code requirement is that fixed axles and wheels have to remain with the purchased home during financing period, which can be a very expensive transport system over 20 years financing for a one-time delivery. Modular homes require additional preparation for using an expensive and large overhead crane to lift from transporter and place onto a prepared foundation.

Prior art for multiple torsion bar cartridge suspensions that easily install and remove on-demand on a recycling basis, for manufactured housing and the like as an example, is unavailable and currently not offered to the industry.

The novel approach is to provide multiple torsion bar cartridge suspensions that easily install and remove from permanently mounted axle tube in the frame and promote that ability in recycling the torsion cartridges and wheels that provide on-demand temporary transportation. FIG. 16A illustrates a typical HUD code frame with multiple axle tubes in it, and the two successive steps to install the torsion cartridge, then wheel mounting. Each braked torsion cartridge can be carried by one person for installation and removal, whereas typical axles require at least two people and installation apparatus.

With this recycling property, the home owner is not financing the multiple axles and tires he will never use over the long term. Using cost is covered in the delivery charge, along with the towing and highway escort vehicles, which is significantly less and makes the manufacturer that much more competitive. Further, the independent torsion cartridges provide significantly better ride quality in preventing typical side-sway and interior damage, such as broken dry wall joints, sagging cabinets, and the like, and repair costs from distant delivery.

The majority of transported homes require 4, 5, 6, or 7 axles because of the weight in quality built units. This tire span causes excessive turning effort and problems during transport. Not only do the extreme tires from the middle ones scuff in turns, but also the road surfaces, resulting in accelerated wear on tires and roads that require costly respective replacement and surface repair. FIG. 16B illustrates a unique method available from compact torsion cartridges in having the axle tubes mounted as side by side for each frame rail. A torsion cartridge is secured on the front tube one side, while another torsion cartridge is secured to the aft tube on the other side. This permits installation and removal on-demand for torsion cartridges and wheels on both sides of the platform frame rails and between them. Thus, the same load carrying capacity with half the wheel span for easier and much less costly replacement and repair costs, if any. Further, not only is there independent suspension for much better ride quality, but also the outer tires are more forward then inner tires, resulting in typical vehicle toe-in for self-stabilizing property.

Figure 17:
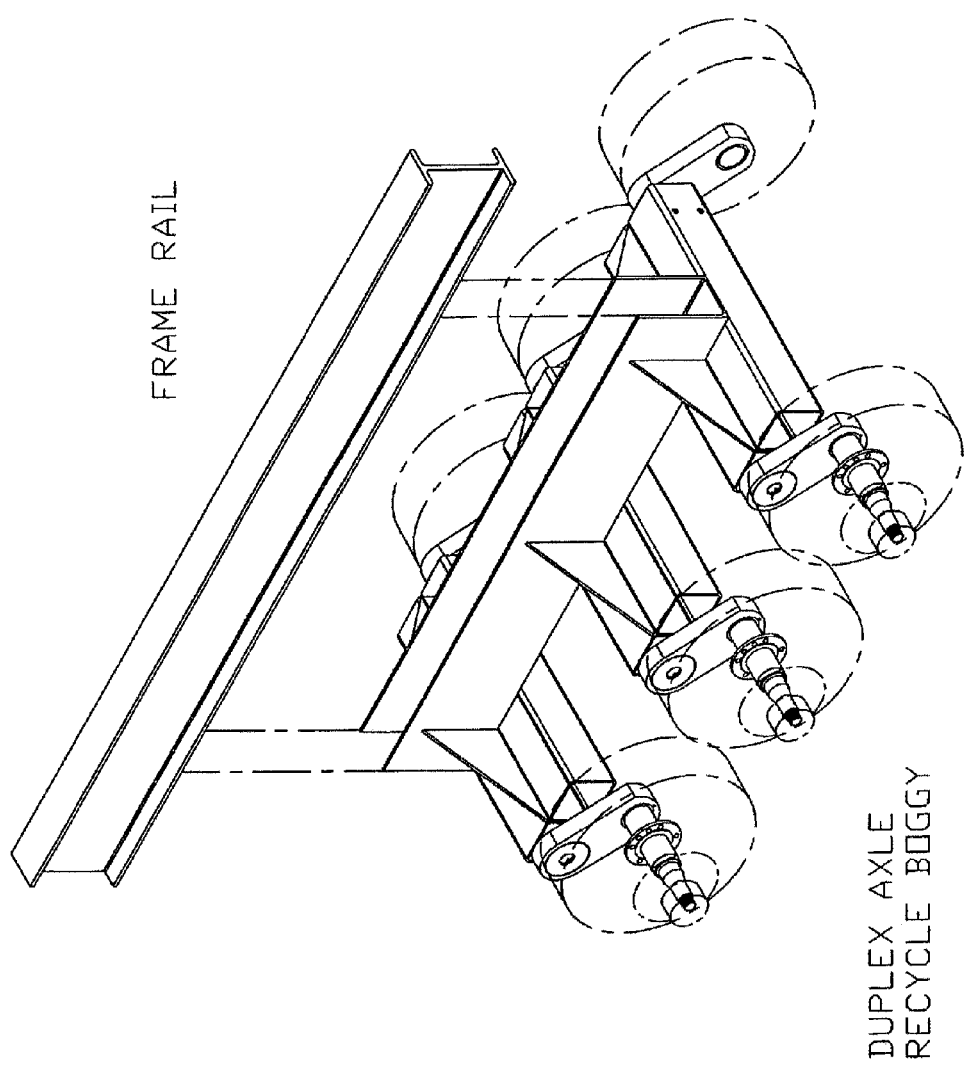
FIG. 17 is a perspective view of a frame rail retaining multiple torsion bar cartridges.

The above novel design can also be made group recyclable by securing side duplex axle tube sets to a common subrail U-channel, for example in FIG. 17, that fits about and secures to typical I-beam frame rail. This way the torsion cartridge boggy units can slide along the frame rails to desired mounting points and secured. Upon securing the home at the site, the boggies can be dropped from mounting position, extracted from underneath home front, and tethered together for towing vehicle return to plant transport and future use. Further, this torsion cartridge boggy design can be applied to existing home frames for temporary transportation.

This novel design provides the manufactured housing industry with better riding and significantly lesser cost recycling multiple torsion bar cartridge suspension systems that easily install and remove on-demand, and halve the wheel span to significantly reduce costly tire replacement and road repair from scuffing in turns.

Boat Trailer and Lift

Boat enthusiasts transport their craft on hull fitting trailers and frequently have a separate boat lift at their dock for various reasons. The former is a portable necessity and the latter an expensive accessory that requires removal and storage during the off-season.

Prior art is unavailable for boat trailer conversion to dockside lift shore station using multiple torsion bar cartridge suspension axle tube(s) for secured lift.

The novel approach is to have one item that performs both functions, easily done with the marine trailer equipped with multiple torsion bar cartridge suspension system. This significantly reduces total cost, required maintenance, storage efforts, and potential theft.

Figure 18:
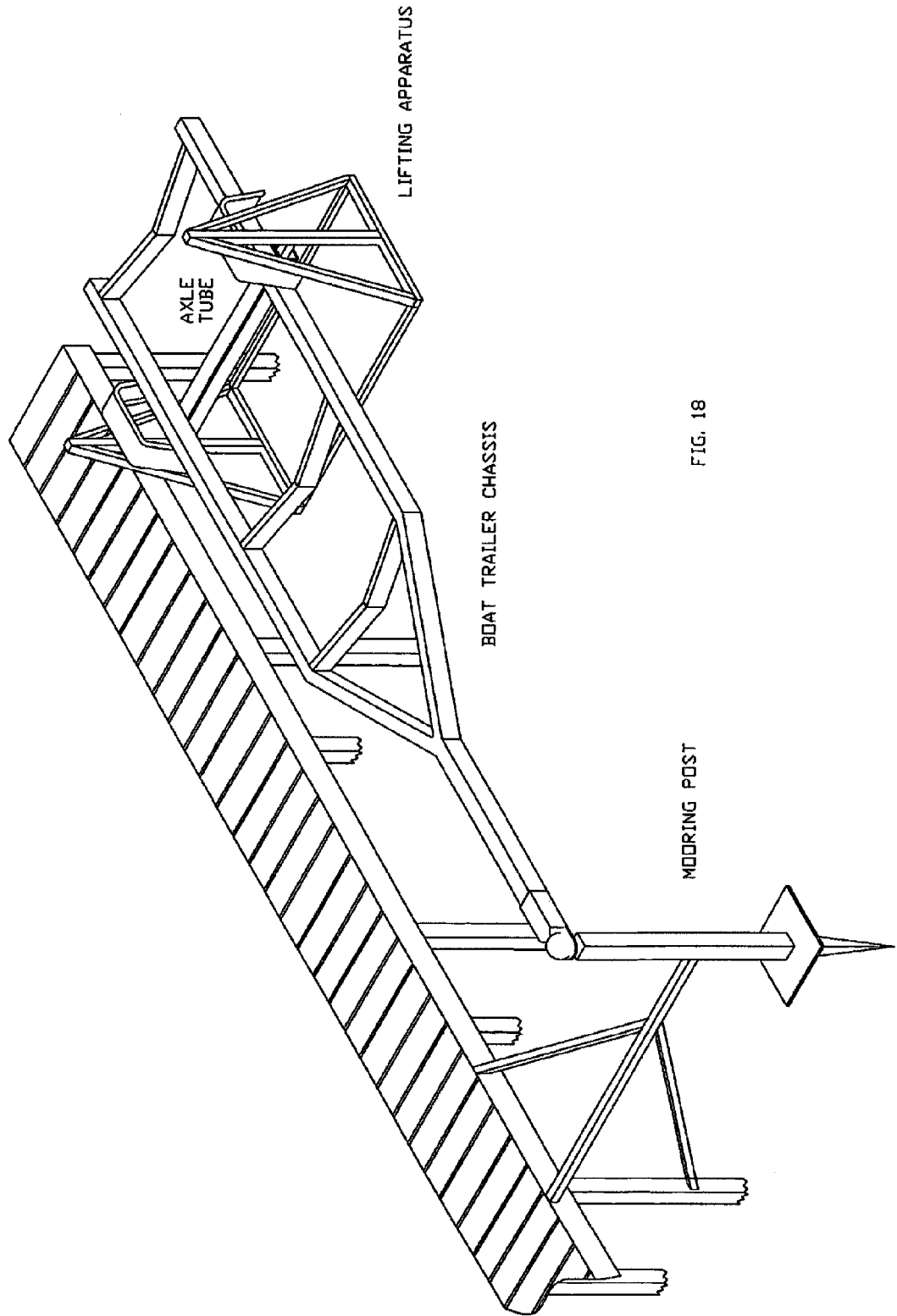
FIG. 18 is a perspective view of a boat trailer chassis retained adjacent a dock and torsion bar cartridges removed from the boat trailer chassis.

FIG. 18 illustrates a dock with an attached mooring post, having a waterway bottom spear point, surface stability plate, and typical coupler ball atop. Trailer is rolled into the water, floated with inflatable bladder(s), and placed parallel to the dock. The ball coupler hitch is lifted and secured to mooring coupler ball. Individual wheels and torsion cartridges are easily removed and stored for the duration. A lifting apparatus can be worked from behind the trailer to engage trailer axle tube opening and secured. Or half-sections can be positioned at each side and interconnected to operate as one unit and secured to trailer axle tube opening. The lifting apparatus is energized to lift the trailer, pivoting at the coupler mooring, out of the water.

The trailer has now been converted to a boat lift use, whereas usually left unattended and possible theft. The process is reversed for desired trailer use or end of season transport and storage. Further, the trailer bunks and rollers are already set to mate with the hull configuration and adequately support it in transport or lift.

This novel design provides the boat owner with a trailer easily on-demand to convert into a properly fit dockside lifting apparatus to secure the boat as desired and return to trailer transport at significantly less cost and prevent possible theft.

Open-Center Trailers

Typical open center trailers, such as for wire cable, propane tanks, and the like, do not have any suspension system as the leaf beam or torsion axle tube would interfere with product.

Figure 19:
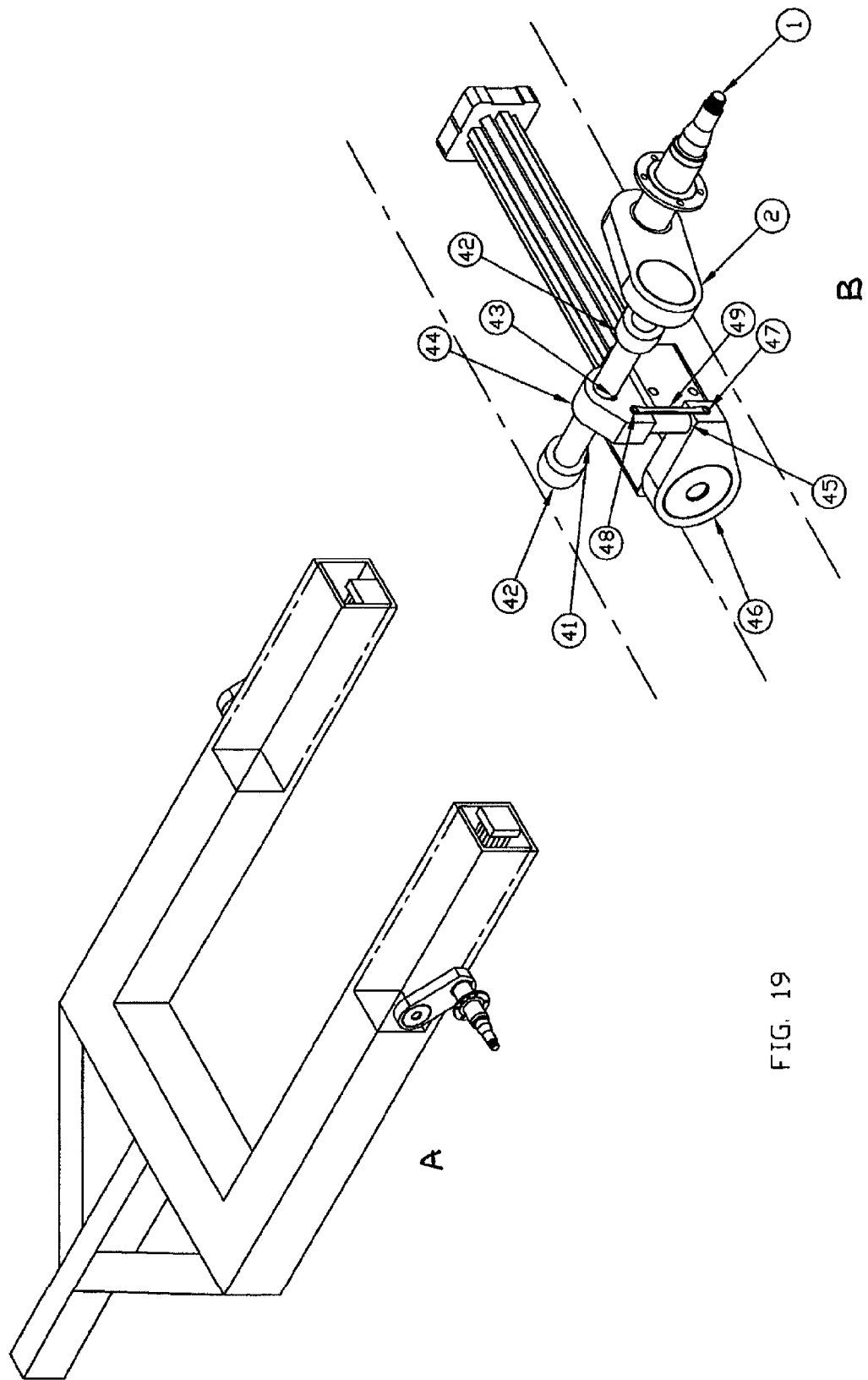
FIG. 19a is a perspective view of a frame of an open center vehicle with two cartridge tubes.
FIG. 19b is a perspective view of a torsion bar cartridge assembly for installation in a cartridge tube of an open center vehicle.

Prior art is unavailable for an open center trailer having multiple torsion bar cartridge suspension and currently not marketed for an industry needing it. The novel approach is to have a multiple torsion bar cartridge assembly installed into each frame leg of an open center vehicle, as in FIG. 19, to allow cargo placed between the legs. In operation spindle 1 and torquearm 2 are driven upward and inducing a torque into transverse torque shaft 41 that passes thru inner and outer bearing apparatus 42 secured to the frame leg. Torque shaft key 43 drives an upper torque block 44 having a hemispherical pocket at the opposite end. Perpendicular to it and below is a lower torque block 46 with hemispherical pocket at its opposite end. The lower torque block 46 attached to typical torsion bar cartridge. Between upper and lower torque blocks 44 and 46 hemispherical pockets is an intimate mating hemispherical ended compression shuttle 45. Both upper and lower torque blocks 44 and 46 have respective tension link posts 47 and 48 to secure tension link 49, or any other suitable means.

As a wheel travels over an obstacle, the torquearm 2 drives the torque shaft 41 and key 43 to force upper torque block 44 downward. Torque block 44 pushes compression shuttle 45 onto lower torque block 46 in a right-angle orientation. Lower torque block 46 drives torsion bars 10 held fast in countertorque hub 13. Upper and lower torque blocks 44 and 46 hemispherical pockets with intimate mating compression shuttle 45 act as typical ball-joint pivots. To maintain shuttle 45 engagement within mating upper and lower torque block 44 and 46 pockets, tension link 49 is attached to tension link posts 47 and 48. Vehicle will now experience independent torsion bar suspension properties while system is protected with each frame leg.

This novel design provides independent multiple torsion bar cartridge suspension with right-angle operation in each frame leg for open center vehicles. Further, existing open center vehicles can be retrofitted and allows for multiple units and wheels per side for increased load capacity.

Independent Wheel Chair Suspension

Most wheelchairs have no suspension, and those that do are limited in operation for the occupant's access and other needs. These people are constrained for hours with little opportunity for comfort as most people enjoy. Sidewalk joints, parking lot depressions, and even carpet strips cause painful impacts and unsteadiness to the occupant.

Prior art is unavailable for wheelchairs equipped with independent multiple torsion bar cartridge suspension systems and none is currently marketed and available for use.

The novel approach is to have fully independent multiple torsion bar cartridges at each wheel as illustrated in FIG. 20. For steerible low profile occupant access, a leading torquearm torsion bar cartridge positions each self-castering wheel. The rear torsion cartridges have usual trailing torquearm for each wheel. This results in the occupant safely placed between torsion cartridge pivot centers in preventing fore and aft tipping.

As the front caster wheels meet an obstruction, the impact vectors are directed to the torsion cartridges for optimum absorption. Further, the rearward axle tube is clear from occupant's feet during uneasy access to the wheelchair. The rear torsion cartridge positions the wheel for operator control and allows traction motor or wheelmotor drive for powered wheelchairs.

The novel design provides 4 wheel independent multiple torsion bar cartridge suspension to wheelchairs in making them safer, stable, and improved ride quality to the occupant.

The invention claimed is:

1. An active torsion cartridge, comprising:
   an axle tube having a first end and a second end;
   a torsion bar assembly includes a plurality of torsion bars, a first end and a second end, one end of said plurality of torsion bars are pivotally retained in said first end of said torsion bar assembly, the other end of said plurality of torsion bars are pivotally retained in said second end of said torsion bar assembly, said first end of said torsion bar assembly is retained in said first end of said axle tube, said second end of said torsion bar assembly is retained in said second end of said axle tube;
   a torque arm having a first end and a second end, said first end of said torque arm is attached to said one end of said plurality of torsion bars;
   an active arm having a first end and a second end, said first end of said active arm is attached on the other end of said plurality of torsion bars; and
   means for positioning is attached to a second end of said active arm to position an angular orientation of said second end of said torque arm relative to a centerline of said torsion bar assembly, said active arm simultaneously supports a torque load in both clockwise and counterclockwise directions.

2. The active torsion cartridge of claim 1, further comprising:
   a wheel spindle is formed on a second end of said torque arm.

3. The active torsion cartridge of claim 1, further comprising:
   a bearing housing is retained on said first end of said torsion bar assembly, an inner perimeter of said axle tube is sized to receive said bearing housing.

4. The active torsion cartridge of claim 1, further comprising:
   an active torque tube is retained on the other end of said plurality of torsion bars, said active arm is retained on said active torque tube.

5. The active torsion cartridge of claim 4, further comprising:
   an active bearing housing pivotally retains said active torque tube, an inner perimeter of said axle tube is sized to receive said active bearing housing.

6. The active torsion cartridge of claim 1, further comprising:
   said means for positioning is an actuator.

7. The active torsion cartridge of claim 1, further comprising:
one end of a second torsion bar assembly is secured to said active arm, said second torsion bar assembly is retained in a second axle tube, a second torque arm is retained on the other end of said second torsion bar assembly.

8. An active torsion cartridge, comprising:
an axle tube having a first end and a second end;
a torsion bar assembly includes a plurality of torsion bars, a bearing housing and an active bearing housing, one end of said plurality of torsion bars are pivotally retained in said bearing housing, the other end of said plurality of torsion bars are pivotally retained in said active bearing housing, said bearing housing is retained in said first end of said axle tube, said active bearing housing is retained in said second end of said axle tube;
a torque arm having a first end and a second end, said first end of said torque arm is attached to said one end of said plurality of torsion bars;
an active arm having a first end and a second end, said first end of said active arm is attached on the other end of said plurality of torsion bars; and
means for positioning is attached to a second end of said active arm to position an angular orientation of said second end of said torque arm relative to a centerline of said torsion bar assembly, said active arm simultaneously supports a torque load in both clockwise and counterclockwise directions.

9. The active torsion cartridge of claim 8, further comprising:
a wheel spindle is formed on a second end of said torque arm.

10. The active torsion cartridge of claim 8, further comprising:
said means for positioning is an actuator.

11. The active torsion cartridge of claim 8, further comprising:
one end of a second torsion bar assembly is secured to said active arm, said second torsion bar assembly is retained in a second axle tube, a second torque arm is retained on the other end of said second torsion bar assembly.

12. An active torsion cartridge, comprising:
an axle tube having a first end and a second end;
a torsion bar assembly includes a plurality of torsion bars, a bearing housing and an active bearing housing, one end of said plurality of torsion bars are pivotally retained in said bearing housing, the other end of said plurality of torsion bars are pivotally retained in said active bearing housing, said torsion bar assembly is capable of being torsionally loaded, said bearing housing is retained in said first end of said axle tube, said active bearing housing is retained in said second end of said axle tube;
a torque arm having a first end and a second end, said first end of said torque arm is attached to said one end of said plurality of torsion bars;
means for pivotally retaining a wheel is formed on said second end of said torque arm;
an active arm having a first end and a second end, said first end of said active arm is attached on the other end of said plurality of torsion bars; and
means for positioning is attached to a second end of said active arm to position an angular orientation of said second end of said torque arm relative to a centerline of said torsion bar assembly, said active arm simultaneously supports a torque load in both clockwise and counterclockwise directions.

13. The active torsion cartridge of claim 12, further comprising:
said means for positioning is an actuator.

14. The active torsion cartridge of claim 12, further comprising:
one end of a second torsion bar assembly is secured to said active arm, said second torsion bar assembly is retained in a second axle tube, a second torque arm is retained on the other end of said second torsion bar assembly.

15. The active torsion cartridge of claim 12, further comprising:
said torque arm of said active torsion cartridge is linked to a torque arm of a second active torsion cartridge.

* * * * *